United States Patent
Konopka et al.

(10) Patent No.: US 12,531,430 B2
(45) Date of Patent: Jan. 20, 2026

(54) SYSTEMS AND METHODS FOR IMPEDANCE MEASUREMENT OF A BATTERY CELL

(71) Applicant: Iontra Inc, Centennial, CO (US)

(72) Inventors: Daniel A. Konopka, Denver, CO (US); John Richard Howlett, III, Centennial, CO (US); Jeffrey J. Holt, Superior, CO (US)

(73) Assignee: Iontra Inc, Centennial, CO (US)

(*) Notice: Subject to any disclaimer, the term of this patent is extended or adjusted under 35 U.S.C. 154(b) by 464 days.

(21) Appl. No.: 17/327,416

(22) Filed: May 21, 2021

(65) Prior Publication Data

US 2021/0367442 A1    Nov. 25, 2021

Related U.S. Application Data

(60) Provisional application No. 63/028,426, filed on May 21, 2020.

(51) Int. Cl.
*H02J 7/00*         (2006.01)
*G01R 31/3842*   (2019.01)
*G01R 31/389*     (2019.01)

(52) U.S. Cl.
CPC ...... *H02J 7/00712* (2020.01); *G01R 31/3842* (2019.01); *G01R 31/389* (2019.01); *H02J 7/0047* (2013.01)

(58) Field of Classification Search
CPC .................................................. G01R 31/389
See application file for complete search history.

(56) References Cited

U.S. PATENT DOCUMENTS

RE47,996 E * 5/2020 Turner ..................... A61N 7/00
11,467,218 B2 10/2022 Ogasawara
(Continued)

FOREIGN PATENT DOCUMENTS

JP      2005091217 A      4/2005
JP      2010156702 A      7/2010
(Continued)

OTHER PUBLICATIONS

International Searching Authority, Transmittal of International Search Report and Written Opinion, issue for PCT/US2021/033734, mailed Oct. 20, 2021.
(Continued)

*Primary Examiner* — Tynese V Mcdaniel
(74) *Attorney, Agent, or Firm* — Derek Donahoe; Polsinelli PC

(57) ABSTRACT

A system is disclosed for determining complex impedance characteristics of one or more battery cells based on the charge signal applied, or to be applied, to the battery cell. Implementations may include measuring the impedance of a battery cell to, in some instances, determine a frequency component or harmonic that defines, at least a portion, of a waveform shape for charging the battery cell. In one implementation, the impedance at the battery cell may be measured or estimated from a discrete charge period being applied to the battery cell or from multiple discrete charge periods applied to the battery cell. The measured differences between the amplitude and time components of the voltage and current waveforms may be used to determine or estimate the magnitude, phase shift, real, and/or imaginary values of the impedance at the battery cell.

26 Claims, 9 Drawing Sheets

(56) References Cited

U.S. PATENT DOCUMENTS

| | | | |
|---|---|---|---|
| 2006/0170397 A1* | 8/2006 | Srinivasan | G01R 31/392 320/132 |
| 2010/0201320 A1* | 8/2010 | Coe | H02J 7/0069 320/136 |
| 2011/0018500 A1 | 1/2011 | Takahashi | |
| 2013/0158924 A1* | 6/2013 | Bucsa | G01R 19/00 702/78 |
| 2014/0084849 A1* | 3/2014 | Lee | H02J 7/00711 320/137 |
| 2014/0375276 A1 | 12/2014 | Zeirer | |
| 2015/0165921 A1* | 6/2015 | Paryani | G01R 31/389 320/109 |
| 2015/0377976 A1 | 12/2015 | Maluf et al. | |
| 2018/0294666 A1 | 10/2018 | Tian et al. | |
| 2019/0154764 A1 | 5/2019 | Schlasza et al. | |
| 2019/0341784 A1 | 11/2019 | Lee | |
| 2020/0014218 A1 | 1/2020 | Maluf et al. | |
| 2020/0081068 A1* | 3/2020 | Kim | B60L 3/04 |
| 2020/0408842 A1* | 12/2020 | Sada | B60L 58/12 |
| 2020/0408844 A1* | 12/2020 | Ogasawara | G01K 13/00 |
| 2021/0103001 A1 | 4/2021 | Seo | |
| 2023/0075287 A1* | 3/2023 | Abe | B60L 58/40 |
| 2024/0262253 A1* | 8/2024 | Yanagita | H01M 8/04649 |
| 2024/0264239 A1* | 8/2024 | Allen | G01R 31/367 |
| 2025/0211014 A1* | 6/2025 | Chitnis | H02J 7/00711 |

FOREIGN PATENT DOCUMENTS

| | | |
|---|---|---|
| JP | 2011174925 A | 9/2011 |
| JP | 2015161631 A | 9/2015 |
| JP | 2015224876 A | 12/2015 |
| JP | 6436271 B1 | 12/2018 |
| KR | 20140080342 A | 6/2014 |
| KR | 2019-0048089 A | 5/2019 |
| WO | 2019054020 A1 | 9/2020 |

OTHER PUBLICATIONS

International Search Report and Written Opinion mailed on Oct. 14, 2022 in International Application No. PCT/US2022/035996, 11 pages.

* cited by examiner

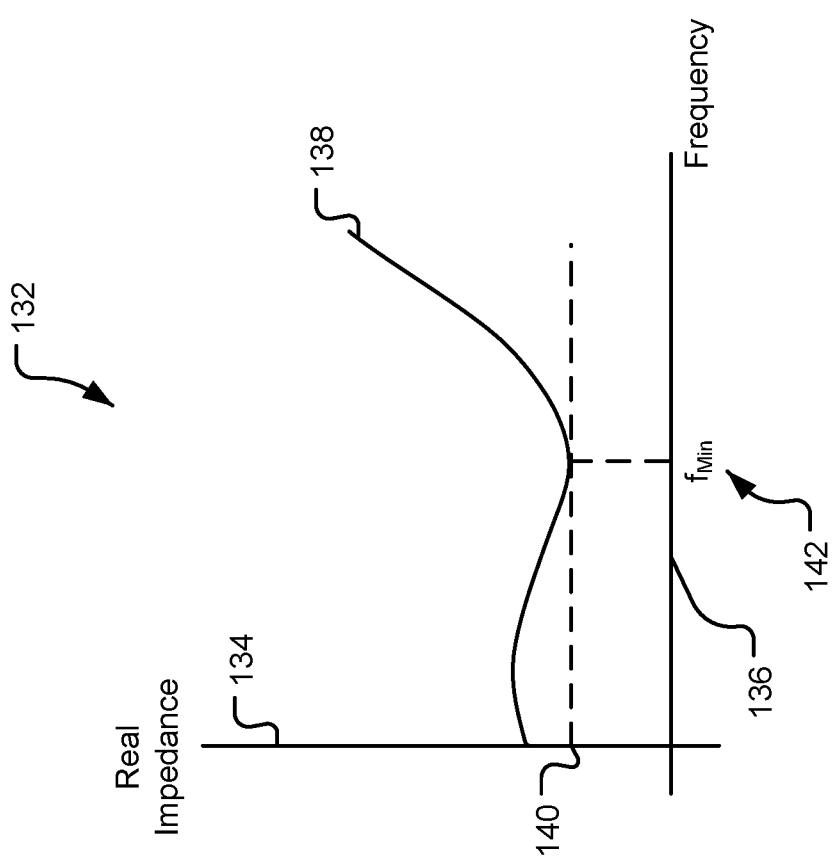

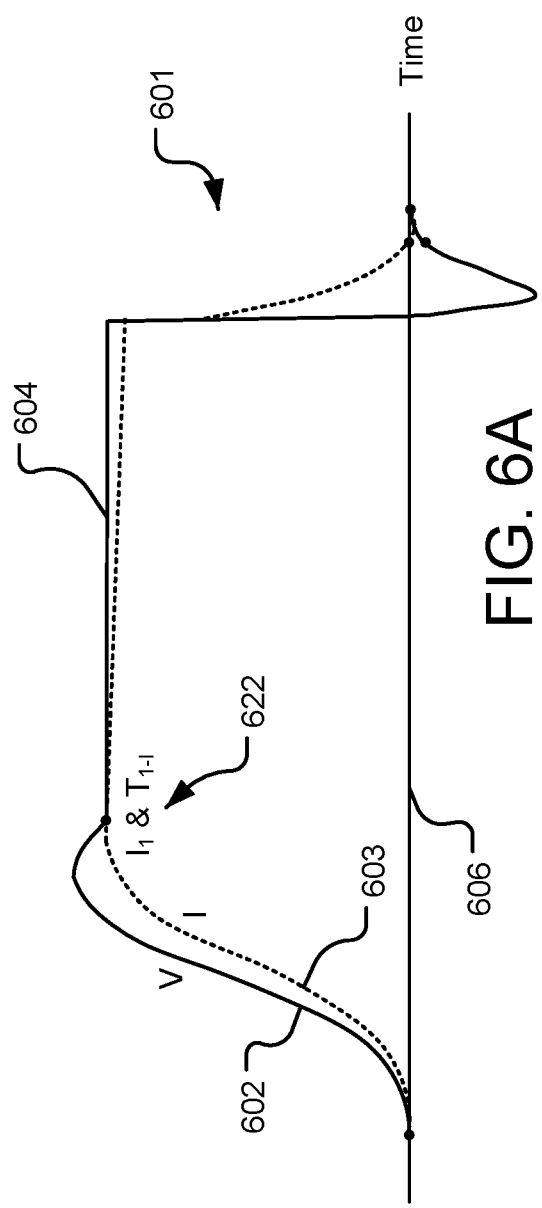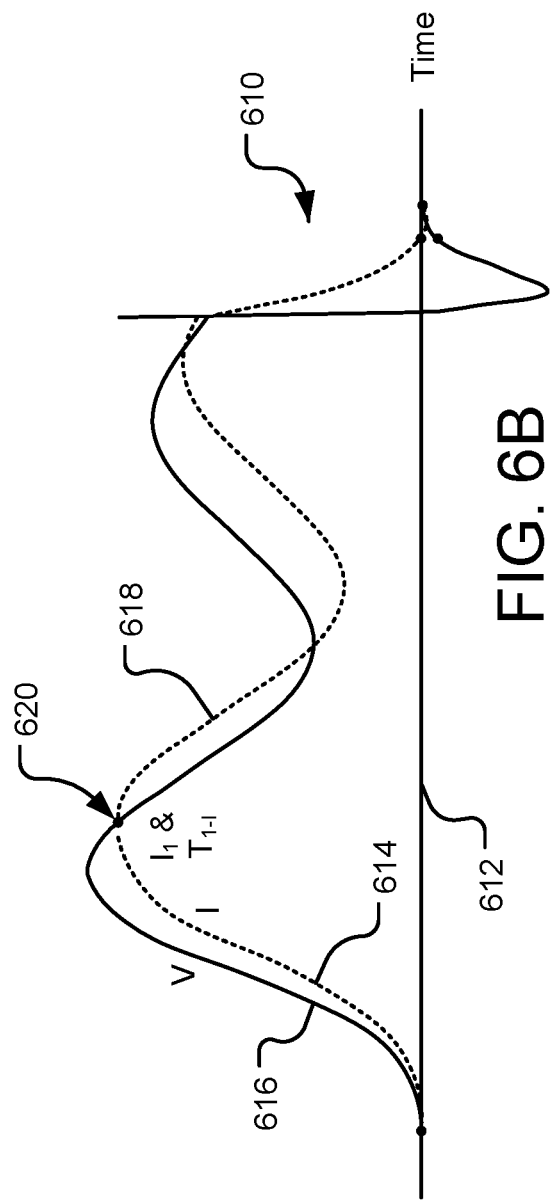

SYSTEMS AND METHODS FOR IMPEDANCE MEASUREMENT OF A BATTERY CELL

CROSS-REFERENCE TO RELATED APPLICATIONS

This application is related to and claims priority under 35 U.S.C. § 119(e) to U.S. Patent Application No. 63/028,426 filed May 21, 2020 entitled "Systems and Methods for Impedance Measurement of a Battery Cell," the entire contents of which is incorporated herein by reference for all purposes.

TECHNICAL FIELD

Embodiments of the present invention generally relate to systems and methods for charging of one or more battery cells, and more specifically to methods for determining impedance of a battery cell, the impedance determination for use in optimizing a charging signal to charge one or more battery cells.

BACKGROUND AND INTRODUCTION

Many electrically-powered devices, such as power tools, vacuums, any number of different portable electronic devices, and electric vehicles, use rechargeable batteries as a source of operating power. Rechargeable batteries are limited by finite battery capacity and must be recharged upon depletion. Recharging a battery may be inconvenient as the powered device must often be stationary during the time required for recharging the battery. In the case of vehicle battery systems and similarly larger capacity systems, recharging can take hours. As such, significant effort has been put into developing charging technology that reduces the time needed to recharge the battery. However, rapid recharging systems typically require costly high-power electronics for the delivery of high levels of charging current, along with current limit and overvoltage circuitry for preventing over-charging and resulting damage to the working battery. Slower recharging systems are less costly, but prolong the recharging operation, undermining the basic objective of a quick return to service.

Battery systems also tend to degrade over time based on the charge and discharge cycling of the battery system, the depth of discharge and overcharging, among other possible factors. Thus, like the speed of charging, efforts are made to optimize charging to maximize battery life, not over discharge the battery or overcharge the battery while using as much of the battery capacity as possible. Often these objectives are at odds, and charging systems are designed to optimize some attributes at the expense of others.

It is with these observations in mind, among others, that aspects of the present disclosure were conceived and developed.

SUMMARY

One aspect of the present disclosure related to a method for monitoring an electrochemical device. The method may include the operations of obtaining, via a processing device, a plurality of measurements of a voltage amplitude and a current amplitude of charge waveform applied to an electrochemical device, calculating a plurality of impedance ratios each comprising a voltage amplitude measurement and a corresponding current amplitude measurement, and obtaining, based on a sum of a subset of the plurality of ratios, complex impedance characteristics of the electrochemical device.

Another aspect of the present disclosure relates to a method for charging an electrochemical device. The method may include the operations of obtaining, based on measurements of a first charge waveform, complex impedance characteristics of an electrochemical device and adjusting, based on the obtained complex impedance characteristics, an aspect of a second charge waveform.

Yet another aspect of the present disclosure relates to a method of charging an electrochemical device. The method may include the operations of, for a charge waveform for charging an electrochemical device, the charge waveform comprising a defined harmonic component, obtaining a representative value indicative of the flow of current to the electrochemical device responsive to the charge waveform, the obtained representative value related to the defined harmonic, and altering an attribute of the charge waveform based on the representative value.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 1C is a graph of measured real impedance values of a battery cell to corresponding frequencies of a charge signal applied to the battery cell in accordance with one embodiment.

FIG. 6A is a second signal diagram of a measured variation in current across a battery cell in response to a voltage-controlled discrete charge period in accordance with one embodiment.

FIG. 6B is a third signal diagram of a measured variation in current across a battery cell in response to a voltage-controlled discrete charge period in accordance with one embodiment.

DETAILED DESCRIPTION

Figure 1A:
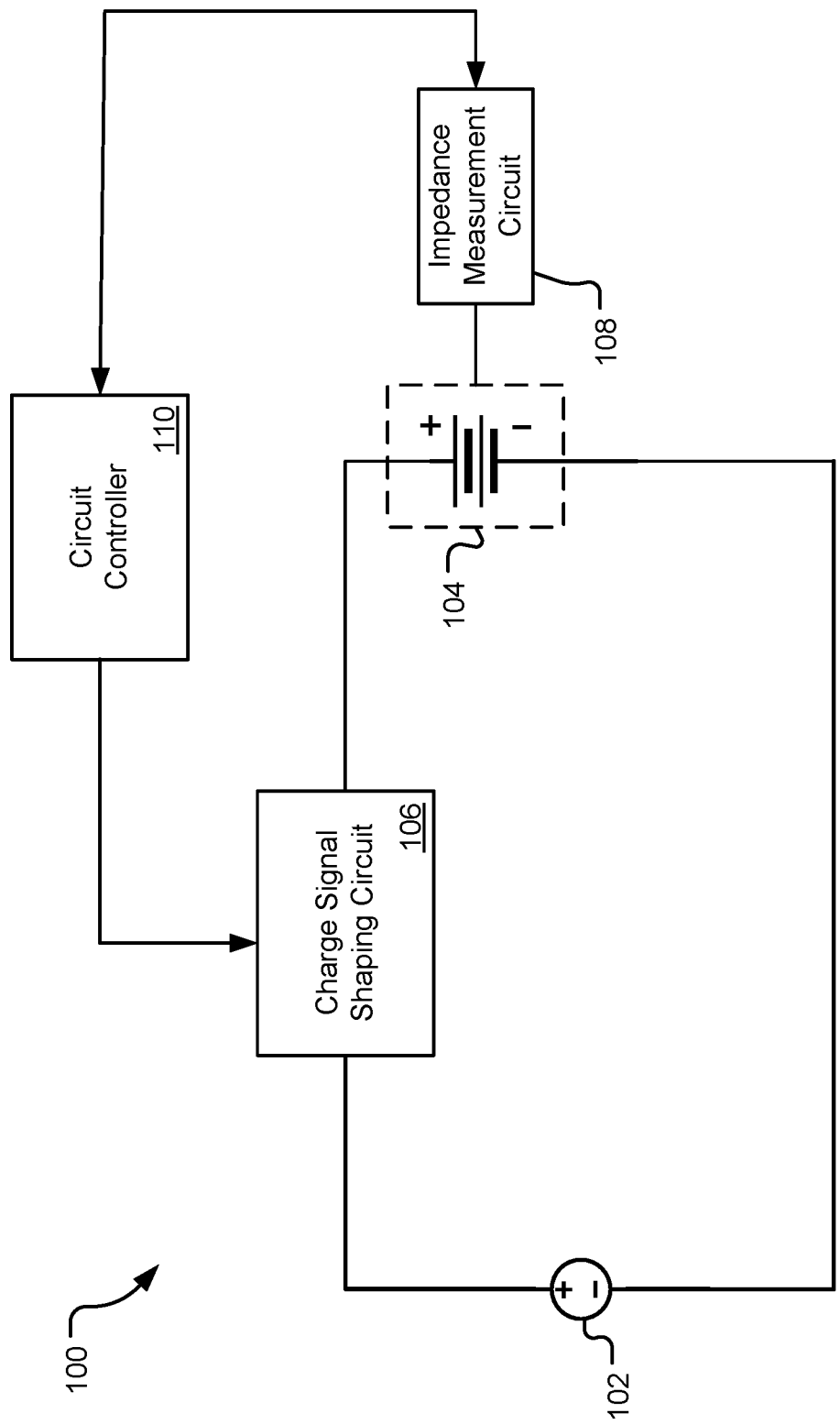
FIG. 1A is a schematic diagram illustrating a circuit for charging a battery cell utilizing a charge signal shaping circuit in accordance with one embodiment.

In accordance with aspects of the present disclosure, it is beneficial to obtain information indicative of complex impedance to a charging signal being applied to a battery, and use such impedance to optimize the charge signal applied to the battery. Aspects of the disclosure take advantage of the notion that conventional charging techniques are often accompanied by uncontrolled harmonics and such harmonics alter the impedance to the charge signal being applied to the battery. Moreover, various harmonics often increase the impedance to the signal being applied to the battery having a deleterious effect on charging efficiency, capacity retention and cycle life. Similarly, harmonics may decrease the amount of chemical energy stored in the battery relative to the applied charging power, and the overall admittance in the case of discrete charge period methods. Aspects of the present disclosure involve optimizing a charge signal corresponding to a harmonic, or harmonics, associated with minimum real or resistance and/or minimum imaginary or reactance impedance values of a battery cell. Such a charge signal may improve the efficiency when charging the battery cell by reducing lost energy due to high impedance at the electrodes of the battery cell. A charge signal associated with a high impedance at the electrodes of the battery cell may result in many inefficiencies, including capacity losses, heat generation, imbalance in electro-kinetic activity throughout the battery cell, undesirable electrochemical response at the charge boundary, and damage to the materials within the battery cell that may damage the battery and degrade the life of the battery cell. Further, cold starting a battery with a fast-rising leading edge of a discrete charge period introduces limited faradaic activity as capacitive charging and diffusive processes set in. During this time, proximal lithium will react and be quickly consumed, leaving a period of unwanted side reactions and diffusion-limited conditions, which negatively impact the health of the cell and its components.

Further, changes in the state of charge, temperature, and other factors of a battery cell may alter the impedance at the electrodes of the battery cell. Thus, during charging, the impedance at the battery cell may vary over time as the battery cell heats and/or the state of charge of the battery cell increases. Thus, in addition to understanding the impedance characteristics of a battery cell being charged, measurement of the impedance at the battery cell at different times or stages of a charging sequence as the impedance profile of the battery cell changes may further improve the charging of the battery cell. Moreover, altering charging characteristics based on such impedance changes may further benefit the battery system in various ways.

As such, systems and methods are disclosed herein for determining complex impedance characteristics of one or more battery cells based on the charge signal applied, or to be applied, to the battery cell. Implementations may include measuring the impedance of a battery cell to, in some instances, determine a frequency component or harmonic that defines, at least a portion, of a waveform shape for charging the battery cell. Although discussed generally herein as a discrete charge period or charge pulse, the charge waveform may be of any form or shape and may include both periodic and aperiodic portions. As such, the systems and methods described herein may apply to any type of charge signal that includes at least one harmonic. The impedance values, including both a real component value and/or an imaginary component value, of the battery cell may be obtained in a variety of ways or methods. It should be appreciated that references to impedance herein may refer to complex impedance expressed in a polar form in which a magnitude value represents a ratio of a voltage amplitude across the battery cell to a current amplitude through the battery cell and a phase value representing a phase shift by which the current leads, lags, or is in phase with the voltage at the battery cell. The references to impedance herein may also refer to complex impedance expressed in a Cartesian form, derived from the polar form, in which a real component or value represents the resistance at the battery cell and an imaginary component represents the reactance at the battery cell. Although the use of the Cartesian form of impedance with the real component and the imaginary component may be used herein to provide for an easier understanding, the systems and methods described may determine such values from a ratio of a voltage amplitude across the battery cell to a current amplitude through the battery cell (or magnitude of the impedance) and a phase difference of the current signal in relationship to the voltage signal (or phase shift of the impedance). In other instances, different characteristics of the battery cell may be measured, determined, or estimated. For example, a conductance and/or susceptance, or any other admittance aspect, either alone or in combination, of the battery cell may be measured or obtained during charging of the battery cell. Still other characteristics of the battery cell may be obtained and/or estimated, such as power delivered, voltage measurements, current measurements, and the like. The systems and methods described herein may measure or otherwise obtain such values of admittance, power or other representative values indicative of the flow of current to the electrochemical device (e.g., charge current into the device), responsive to the charge waveform and based on some aspect of a defined harmonic of the charge waveform, and use such values to tailor a charge signal. In one example, the tailoring of the waveform involves optimizing, and defining, a harmonic feature of the waveform based on one or more such representative values.

In one implementation, the impedance at the battery cell may be measured or estimated from a discrete charge period of a charge waveform being applied to the battery cell or from multiple discrete charge periods applied to the battery cell. For example, aspects of the amplitude and time components of the voltage and current components of the charge signal at the battery cell may be measured and/or estimated. In another example, aspects of the amplitude and time components of the voltage and current components of the charge signal over multiple discrete charge periods or at various times may be measured and/or estimated. Thus, aspects discussed herein with reference to measurements obtained during one discrete charge period of a charge waveform may similarly apply to measurements obtained over multiple discrete charge periods or at other various times of the charge waveform. The measured differences between the amplitude and time components of the voltage and current waveforms may be used to determine or estimate the magnitude, phase shift, real, and/or imaginary values of the impedance at the battery cell. In one example, real and imaginary impedance values may be determined from differences at a leading edge of a charge discrete charge period that is defined from a known harmonic with the differences in the amplitude of the voltage and current waveforms taken at a known point or points of the harmonic/waveform edge. Similarly, aspects of the impedance may be approximated from amplitude measurements of the voltage and current portions at other points of a charge waveform. In still other implementations, the various measurements of the voltage and current waveforms of the charge signal may be adjusted based on weighted values applied to the measurements. In general, several aspects of the voltage and current waveforms of the charge signal may be determined or measured to determine or estimate the impedance at the battery cell. In another implementation, hundreds or thousands of measurements of the voltage and current portion of the charge signal may be obtained and analyzed via a digital processing system. In general, more measurements of the waveforms may provide a more accurate analysis of the effect of the waveforms on the impedance of the battery cell to better determine the frequency effect of impedance, and design the waveform based on the frequency.

In one particular instance, a charge waveform may be applied to a battery cell and parameters associated with different portions of the waveform may be measured or estimated. One or more key impedance parameters may be calculated from the measured portions of the waveform. In some instances, the key impedance parameters may be determined via a processor configured to calculate or estimate the various key impedance parameters from the measured impedances at the battery cell at various sections of a charge waveform. Separate control processes may adjust and/or optimize the components of the charge waveform based on the key impedance parameters. Each controller may represent a separate process working to optimize different parts of the waveform concurrently or individually in sequence. For example, one or more of the impedance parameters may be weighted and a score, error, probability, or other feedback measurement may be determined from the weighted impedance values. Through adjustment of the waveform features, the feedback measurement may be increased until an optimized or highest score is achieved. When an optimized feedback measurement is achieved, the controllers may control the charge waveform based on the calculated feedback measurements. The controllers of the charge waveform may act concurrently with rules, or in a predefined sequence (which may be overridden in the event of certain triggers defined by programmed rules).

FIG. 1A is a schematic diagram illustrating an example charge circuit 100 for recharging a battery cell 104 in accordance with one embodiment. In general, the circuit 200 may include a power source 102, which may be a voltage source or a current source. In one particular embodiment, the power source 102 is a direct current (DC) voltage source, although alternating current (AC) sources are also contemplated. In general, the power source 102 supplies a charge current for recharging a battery cell 104. In some implementations, the circuit 100 of FIG. 1A may include a charge signal shaping circuit 106 between the power source 102 and the battery cell 104 to shape one or more waveforms of a charge signal for use in charging the battery cell 104. A circuit controller 110 may be in communication with the charge signal shaping circuit 106 and provide one or more inputs to the charge signal shaping circuit 106 to control the shaping of the waveforms of the charge signal. One particular implementation of the charge shaping circuit 106 is described in greater detail in co-filed U.S. Non-Provisional application Ser. No. 17/232,975 titled "Systems and Methods for Battery Charging", the entirety of which is incorporated by reference herein.

In some instances, the circuit controller 110 may control the charge shaping circuit 106 to shape the waveforms of the charge signal based on one or impedance measurements or other characteristics of the battery cell 104. For example, the charge signal shaping circuit 106 may be controlled to alter energy from the power source 102 to generate a charge waveform that at least partially corresponds to a harmonic associated with a minimum real impedance value, a minimum imaginary impedance value, a maximum conductance value, an optimal susceptance value, and the like of the battery cell 104. As such, the circuit controller 110 may communicate with an impedance measurement circuit 108 connected to the battery cell 104 to measure cell voltage and charge current, as well as other cell attributes like temperature and measure or calculate the impedance across the electrodes of the cell 104. In one example, impedance may be measured based on the applied waveforms and may include a real or resistance value and an imaginary or reactance value. In another example, impedance may be measured based on the applied waveforms and may include a magnitude value determined from a ratio of a voltage amplitude and a current amplitude and a phase shift value determined from a lag of a current signal in relation to a voltage signal. In general, the impedance of the battery cell or cells 104 may vary based on many physical of chemical features of the cell, including number and configuration of cells, a state of charge and/or a temperature of the cell(s). As such, the impedance measurement circuit 108 may be controlled by the circuit controller 110 to determine various impedance values of the battery cell 104 during recharging of the cell, among other times, and provide the measured impedance values to the circuit controller 110. In some instances, a real component of the measured impedance of the battery cell 104 may be provided to the charge signal shaping circuit 106 by the circuit controller such that energy from the power source 102 may be sculpted into one or more charge waveforms that correspond to a harmonic associated with a minimum real impedance value of the battery cell 104. In another example, the circuit controller 110 may generate one or more control signals based on the received real impedance value and provide those control signals to the charge signal shaping circuit 106. The control signals may, among other functions, shape the charge waveform to include a harmonic component corresponding to the real impedance value.

Figure 1B:
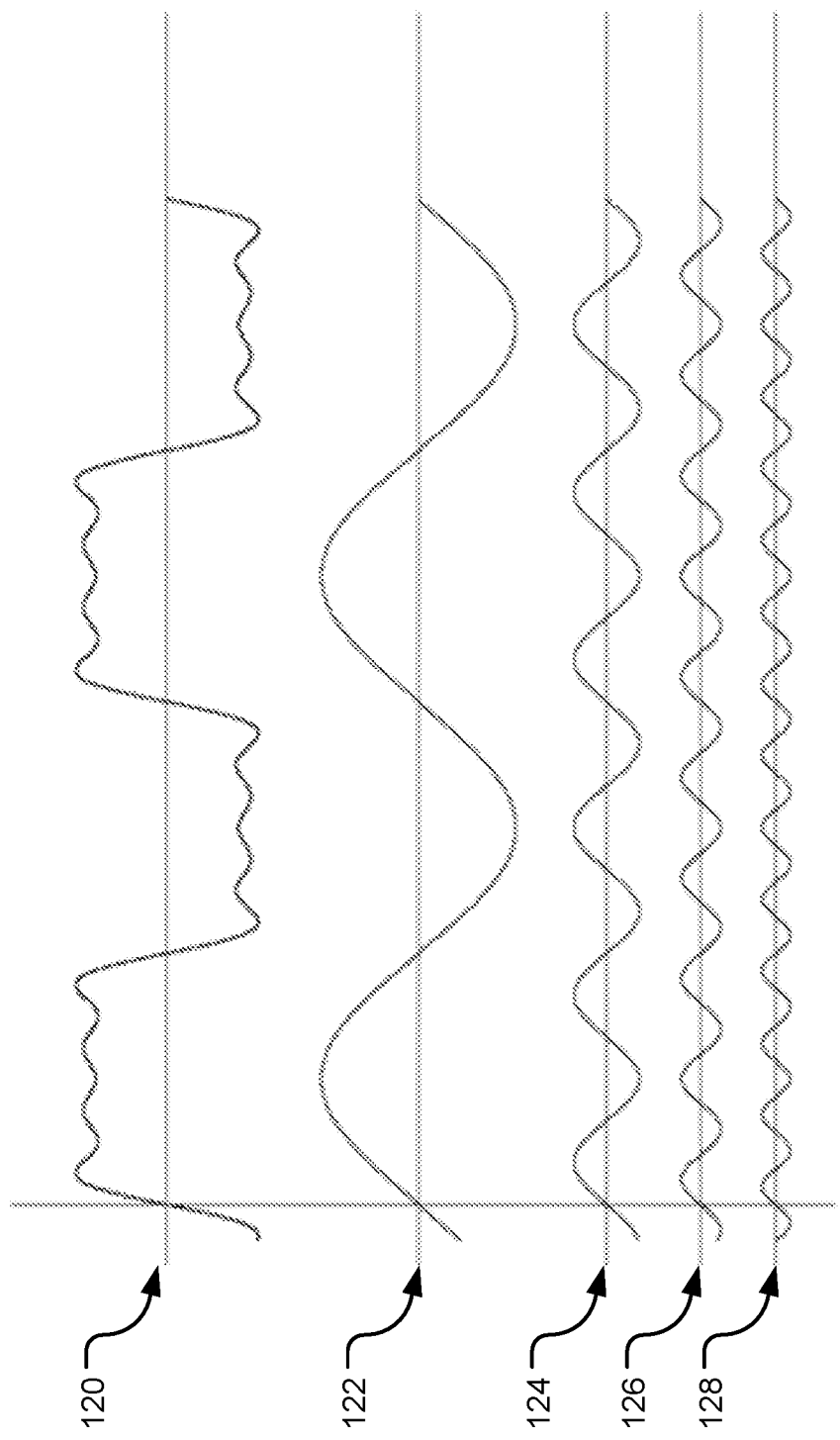
FIG. 1B is a signal diagram of a charge signal for a battery cell and the component harmonics of the charge signal in accordance with one embodiment.

Waveforms generated from a conventional power supply may be comprised of multiple harmonic components. For example, FIG. 1B illustrates an example a sequence of waveforms 120, which could be applied to charge a battery cell 104. The waveform signal 120 is comprised of several sinusoidal signals, or harmonics, of different frequencies. In the illustrated example, the waveform signal 120 is a summation of sinusoidal signal 122 of a first frequency, sinusoidal signal 124 of a second frequency, sinusoidal signal 126 of a third frequency, and sinusoidal signal 128 of a fourth frequency. In any given situation, more or fewer frequency components are possible, and the example of four is used merely for purposes of illustration and example. The combination of the sinusoidal harmonics 122-128 comprise the waveform signal 120 of FIG. 1B. Aspects of the present disclosure involve, controlling the shape of the waveforms, including magnitude and timing of harmonics, in such a signal and using that shaped signal to charge a battery cell, where various aspects of the waveforms, e.g., a leading edge, a body, and/or a trailing edge, may be created through a harmonic or combination of harmonic components. As explained in co-filed U.S. Non-Provisional application Ser. No. 17/232,975 titled "Systems and Methods for Battery Charging," the impedance at the battery cell 104 due to the application of a waveform signal 120 may be dependent upon the harmonics or frequencies contained within the charge signal. For a so-called square wave signal, for example, rather than being a sequence of set DC voltage levels, the signal may include a sequence of pulses that each consist of various frequency harmonics as introduced with regard to FIG. 1B. Moreover, the uncontrolled implicit harmonics of the pulses may be associated with relatively high impedances at the battery cell 104 should such an uncontrolled pulse signal be applied in charging, lowering the efficiency of the square wave to charge the battery cell 104. As such, generating or shaping a charge signal to remove or diminish harmonics at which high impedance is present at the battery cell 104 may improve the efficiency in charging the battery, reduce heat generated during charging, reduce damage to the anode or cathode, reduce charging time, allow for more capacity to be used, and/or increase battery life.

FIG. 1C is a graph 132 illustrating a relationship between a real impedance value (axis 134) of a battery cell 104 to corresponding harmonics (illustrated as logarithmic frequency axis (axis 136)) included in a charge signal applied to the battery cell. The plot 138 illustrates real impedance values across the electrodes of a battery cell 104 at the various frequencies of a sinusoidal component of a charge signal that may applied as a charge signal. As shown, the real impedance values 138 may vary based on the frequency of the charge signal, with relatively lower impedances between initially higher impedances at lower frequencies and then a relatively rapid increase in real impedance values at harmonics higher than the frequency at which the lowest impedance is found. The plot 138 of real impedance values for the battery cell 104 indicates a minimum real impedance value 140 that corresponds to a particular charge signal frequency 142, labeled as $f_{Min}$. The plot of real impedance values 138 for the battery cell 104 may be dependent on many factors of the cell, such as battery chemistry, state of charge, temperature, composition of charge signal, and the like. Thus, the frequency $f_{Min}$ 142 corresponding to the minimum real impedance value 140 of the battery cell 104 may similarly be dependent upon the characteristics of the particular battery cell 104 under charge. The frequency $f_{Min}$ 142 may correspond to other aspects of the battery cell 104, such as the configuration of the cells in a pack and the connections between the cells in the pack.

Figure 2:
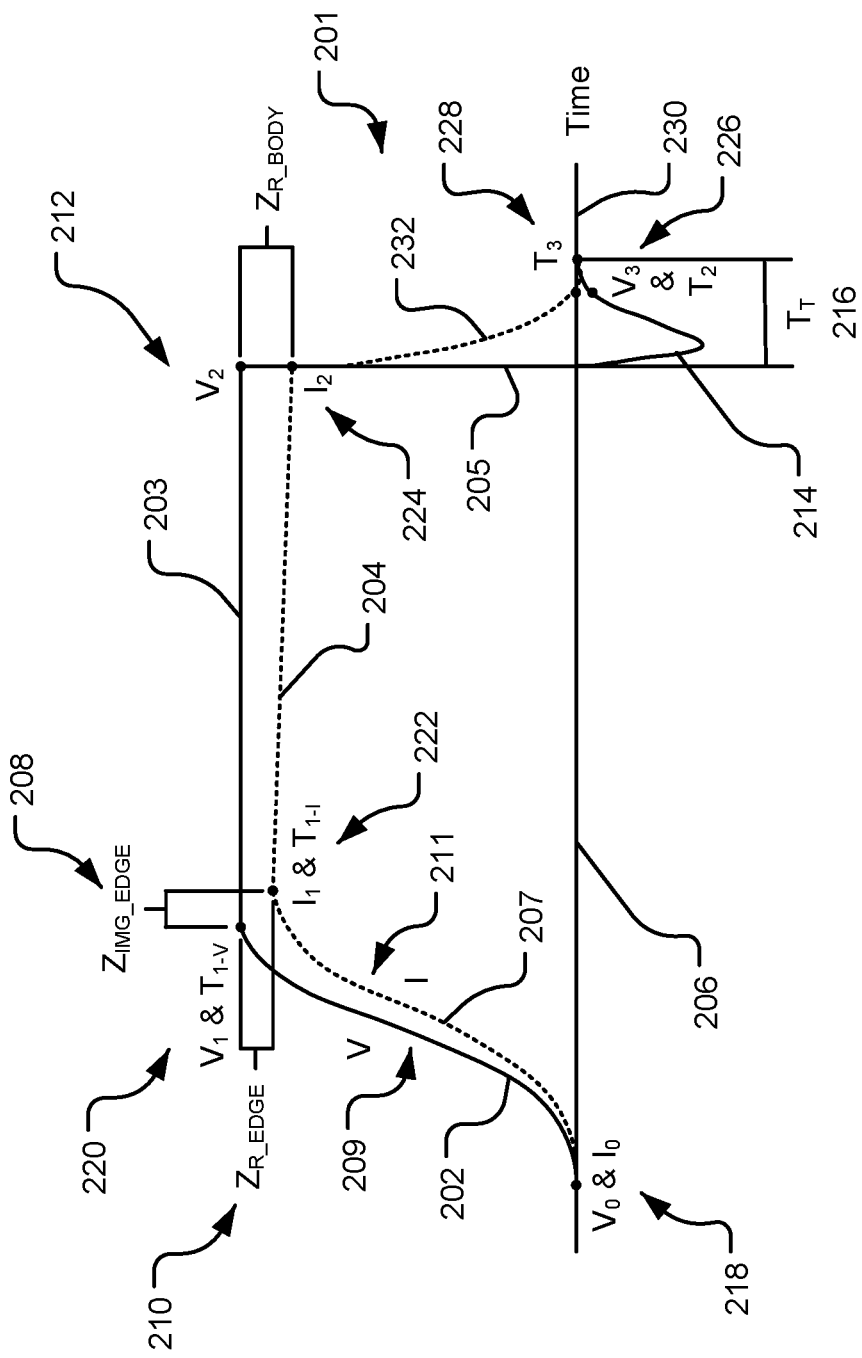
FIG. 2 is a signal diagram of a measured variation in current across a battery cell in response to a voltage-controlled discrete charge period in accordance with one embodiment.

In one implementation, the charge signal shaping circuit 106 may provide, in response to one or more control signals from the circuit controller 110, a charge discrete charge period similar to that illustrated in FIG. 2. FIG. 2 is a signal diagram of a measured voltage drop 202 across a battery cell (illustrated as the solid line 202 labeled "V") and a measured current 204 at battery cell (illustrated as the dashed line 204 labeled "I") versus time 206 in response to a charge signal applied to the battery cell in accordance with one embodiment. In general, the charge signal shaping circuit 106 may control the voltage 202 across battery cell to include a sloping front edge 209 (sometimes corresponding to a harmonic associated with an impedance measurement at the battery cell), a constant or near constant body portion 203 (corresponding to a upper voltage limit of the power source 102), and a sharp falling edge 205. However, for a voltage-controlled variant of the circuit 100, the current 204 component of the discrete charge period 201 may lag behind the voltage component 202. More particularly, the current 204 at the battery cell may take some time to return to zero after the voltage 202 to the battery is removed at the falling edge 205 of the discrete charge period 201. As this delay in the current 204 at the battery returning to zero may add additional inefficiencies to discrete charge period, some implementations of the discrete charge period 201 may include the voltage 202 of the charge signal controlled to drive the voltage below a transition voltage corresponding to a zero current at the battery cell, represented in FIG. 2 as portion 214 of the discrete charge period. In general, the transition voltage is the voltage of a charge signal at which current flow into the battery is reversed and may be similar to the float voltage of the battery cell. In particular, driving the voltage 214 below the transition voltage for a period of time following the falling edge 205 of the discrete charge period may drive the current 204 to zero amps at a faster rate as compared to a discrete charge period without such a shape. The duration $T_T$ 216, during which the voltage 214 is controlled below the transition voltage corresponding to a zero current, may be determined or set by the circuit controller 110 to minimize the time for the current 204 at the battery cell 104 to return to zero amps. Once the current 204 has returned to zero amps for a particular rest period, another discrete charge period 201 may be applied to the battery cell 104. In another instance, the resting voltage 230 may be stabilized without external control in addition to the current 204 returning to zero amps prior to the next discrete charge period 201 being applied to the battery cell 104. In either instance, it may be desirable to minimize or control the amount of discharge that occurs at the end of the discrete charge period 201 before the application of another charge discrete charge period.

As mentioned above, the circuit controller 110 may control an impedance measurement circuit 108 to measure the impedance at the battery cell 104 and use such measurements to control the charge signal shaping circuit 106 to generate one or more additional or future charge discrete charge period based on the measured impedances. In particular, as the impedance at the battery cell 104 may correspond to the harmonics included in the charge signal, efficiency of charging the battery cell may be improved by limiting the harmonics in a charge signal to those at or near the frequency $f_{Min}$ 142. To generate such a charge signal, the circuit of FIG. 1A may be configured or designed to obtain impedance values at the battery cell 104 at various points during a discrete charge period or over multiple discrete charge periods to determine the impedance profile of the battery cell 104 and adjust additional or future charge periods in response. In other examples, the circuit controller 110 may control the impedance measurement circuit 108 to obtain other characteristics of the battery cell 104 and/or charge signal applied to the battery cell and use the obtained characteristics to estimate an impedance at the battery cell. For example, impedance values of the battery cell 104 may be measured or estimated based on amplitude and time features of the voltage waveform 202 and/or the current waveform 204 measured at the battery cell by the impedance measurement circuit 108. Further, the amplitude and time features of the waveforms 202, 204 may be measured at different sections of an applied discrete charge period or multiple applied discrete charge periods to determine or estimate the impedance at the battery cell 104. The determined or estimated impedance values of the battery cell 104 may then be used by the circuit controller 110 to adjust future discrete charge periods 201 of the charge signal to improve the efficiency of the charge signal in recharging the battery cell 104.

Figure 3:
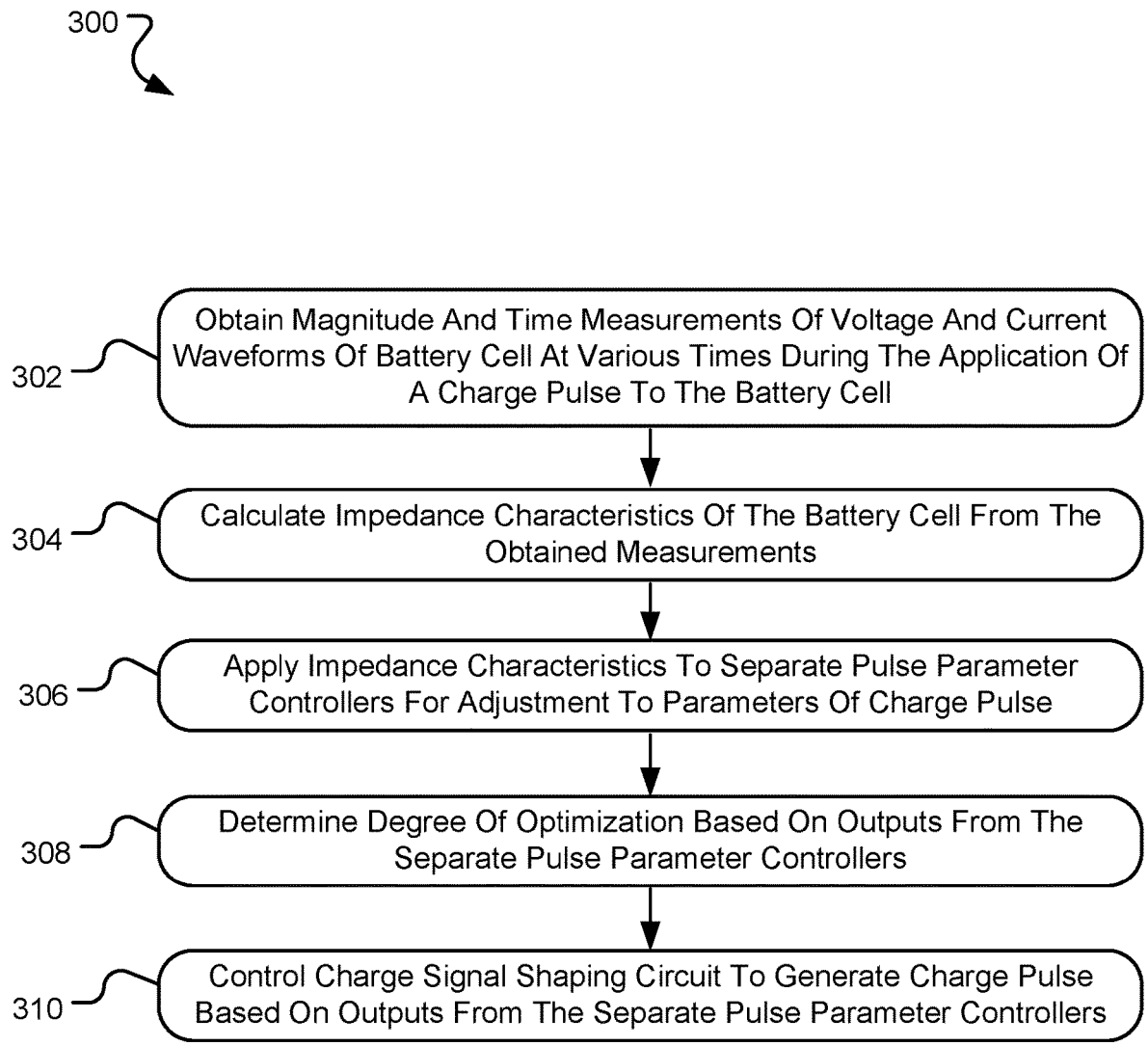
FIG. 3 is a flowchart illustrating a method for determining an impedance of a battery cell at various times based on measured characteristics of waveforms at the battery cell in accordance with one embodiment.

FIG. 3, in particular, is a flowchart illustrating one method for determining impedance values of a battery cell at various times based on measured characteristics of waveforms at the battery cell in accordance with one embodiment. The operations of the method may be performed by components of the impedance measuring circuit 108, perhaps in response to one or more control signals provided by the circuit controller 110. Other components of the circuit 100, however, may perform one or more of the operations of the method 300. Further, the measurements of the waveforms may be obtained through one or more hardware components, one or more software programs, or a combination of hardware and software components. Also, one or more of the operations described may not be performed and the operations may be performed in any order.

Beginning in operation 302, the impedance measurement circuit 108 may obtain amplitude and/or time measurements of voltage and current waveforms at the battery cell 104 at various times during the application of the discrete charge period to the battery cell 104. As explained above and using the voltage 202 and current waveforms 204 of FIG. 2 as examples, a voltage waveform (such as waveform 202) or a current waveform (such as waveform 204) may be provided to a battery cell 104 by the charge signal shaping circuit 106. In the particular example shown, the circuit 100 of FIG. 1A may include voltage-controlled components such that the voltage waveform 202 controls the recharge of the battery cell 104. In alternate implementations, the circuit 100 may include current-controlled components such that a current waveform is shaped by the charge signal shaping circuit 106 to recharge the battery cell 104. Regardless of the type of waveform applied, a voltage drop across the battery cell 104 and a measured current at battery cell at various times and in response to the discrete charge period applied to the battery cell may be determined or measured. In one particular implementation, the impedance measurement circuit 108 may obtain a first voltage measurement $V_0$ and a first current measurement $I_0$ may be obtained at a first time 218. In one implementation, the first time 218 may correlate to a time when the current at the battery cell 104 is zero amps before the application of the discrete charge period 201 to the battery cell 104. Although the current at time 218 may be zero amps, voltage $V_0$ may be a floating voltage of the battery cell 104. Further, although illustrated in the same, the represented values of the voltage component 202 and the current component 207 may be scaled and overlaid such that the signals may be illustrated in the same plot, despite being measured in different units. For example, x-axis 206 may represent both zero amps for the current plot 207 and a transition voltage value (in some instances more or less than a zero value) for the voltage plot 202.

Additional voltage and current measurements may be taken at a later time corresponding to the waveforms of the discrete charge period 201. In particular, the impedance measurement circuit 108 may measure the voltage $V_1$ 220 at the peak of the leading edge 209 of the voltage waveform 202. In addition, the impedance measurement circuit 108 may measure a time difference $T_{1-V}$ between the initial voltage measurement $V_0$ and the time at which voltage $V_1$ 220 occurs. The time difference $T_{1-V}$ may be used, as explained below, to determine a reactance value or phase shift value of the impedance at the battery cell 104. In a similar manner, the impedance measurement circuit 108 may measure the current $I_1$ 222 at the peak of the leading edge 211 of the current waveform 207. Also, the impedance measurement circuit 108 may measure a time difference $T_{1-I}$ between the initial current measurement $I_0$ and the time at which voltage $I_1$ 222 occurs. In this illustrated example, the current waveform 204 is delayed in relation to the controlled voltage waveform 202 such that $T_{1-I}$ occurs after $T_{1-V}$. Additional amplitude values of the voltage waveform 202 and the current waveform 204 may be taken at the falling edge 205 of the discrete charge period 201. In particular, the impedance measurement circuit 108 may measure the voltage $V_2$ 212 and the current $I_2$ 224 at the occurrence of the falling edge 205 of the discrete charge period 201. Generally, due to the impedance at the battery cell 104, less than all of the voltage 202 of the discrete charge period 201 is converted to charge current 204 such that there is some difference between the applied voltage and the received current at the battery cell 104.

Still additional time measurements may be taken by the impedance measurement circuit 108. In one instance, a voltage $V_3$ and time difference $T_2$ 226 between the initial voltage measurement $V_0$ and the time at which voltage $V_3$ occurs may be obtained when the current waveform 204 returns to zero amps. In some instances, time difference $T_2$ 226 may be referred to as the fade time as a measure of the time to bring the current waveform 204 to zero amps. In some instances, the voltage $V_3$ may be below the transition voltage for the battery cell 104 to aid in driving the current to zero amps. However, the charge signal for the battery cell 104 may be controlled to wait until the voltage and current at the battery cell 104 returns to a rest state corresponding to zero amps and the voltage at the transition voltage for the battery cell. Thus, the impedance measurement circuit 108 may further measure a time difference $T_3$ 228 between the initial voltage measurement $V_0$ and the time at which voltage the voltage waveform 202 returns to the transition voltage and the current waveform 204 returns to zero amps. In some instances, an additional rest period may be added to the charge signal before an additional discrete charge period is generated for the battery cell 104 to prevent inefficiencies in the charge signal.

It should be appreciated that any number and type of characteristics of the voltage and current waveforms 202, 204 may be measured or determined by the impedance measurement circuit 108 or the circuit controller 110. For example, other amplitudes of the voltage waveform 202 and/or amplitudes of the current waveform 204 may be measured and a time difference of the occurrence of such amplitudes may be determined. Further, the points of the discrete charge period 201 at which the measurements are taken may be dependent upon the shaping of the discrete charge period by the circuit 100 as the measurements may be used to determine the characteristics of the shaped charge period, as described in more detail below.

In operation 304, impedance measurement circuit 108 or the circuit controller 110 may calculate or estimate one or more impedance characteristics of the battery cell based on the measured characteristics of the charge waveform 201. Further, the calculated or estimated impedance characteristics or other characteristics of the battery cell response may correspond to difference sections or portions of the discrete charge period 201. For example, the impedance measurement circuit 108 may determine a ratio of the amplitude values measured at $V_1$ 220 and $I_1$ 222 to estimate a real impedance value or impedance magnitude at the peak of the leading edge portion 209 of the discrete charge period 201.

In one implementation, the real impedance value at the peak may be calculated based on $Z_{R\_EDGE}=(V_0-V_1)/(I_0-I_1)$. In a similar manner, the impedance measurement circuit 108 may determine a ratio of the amplitude values of $V_2$ 212 and $I_2$ 224 to estimate a real impedance value or impedance magnitude at the end of the body portion of the discrete charge period 201 through the equation $Z_{R\_BODY}=(V_0-V_2)/(I_0-I_2)$. However, the estimated real impedance $Z_{R\_BODY}$ may be approximated as the portion of the discrete charge period 201 at which the measurements $V_2$ 212 and $I_2$ 224 are taken may include many undistinguishable harmonics such that $Z_{R\_BODY}$ may include unknown reactance portions. Such difficulties are generally not present in the calculation of $Z_{R\_EDGE}$ as the leading edge 209 of the discrete charge period 201 may comprised of a single harmonic.

In a similar manner, the, phase shift, reactance, or imaginary values of the complex impedance of the battery cell 104 may be determined or estimated. For example, the impedance measurement circuit 108 may determine a difference in the time $T_{1-V}$ and $T_{11}$ and utilize the measured time difference to estimate an imaginary impedance value at the peak of the leading edge 209 portion of the discrete charge period 201. In some instances, $Z_{IMG\_BODY}$ may be roughly approximated by measuring the impedance characteristics during the time of the fade duration $T_T$ 216. In particular, the imaginary component of the impedance at the falling edge 205 may relate to the duration $T_T$ 216 of the fade portion of the discrete charge period 201 such that the imaginary component may be estimated based on the measured duration $T_T$ 216. In general, many aspects of the impedance of the battery cell 104 may be determined or estimated based on any number of measurements of the discrete charge period 201 applied to the battery cell 104.

In operation 306, the circuit controller 210 may apply one or more of the calculated or determined impedance characteristics to one or more discrete charge period parameter controllers to determine adjustments to the shape of the discrete charge periods of the charge signal provided to the battery cell 104. In particular, the controllers may utilize the impedance measurements or estimates as inputs to the controllers. In some instances, the determined impedance values may be weighted to adjust the effect of the measurements against other measurements or estimates. In general, any aspect of the waveforms 202, 204 may be weighted, not necessarily just against the impedance values, but a variety of parameters including peak values, % time utilization (where a square pulse at 50% duty would be 50% utilization, DC would be 100%), and the like.

In operation 308, the discrete charge period parameter controllers may adjust aspects of the charge waveform 201 to achieve an optimized charge waveform shape. For example, separate waveform parameter controllers may be configured to adjust or optimize a corresponding portion of the charge waveform 201. In one particular implementation, the waveform parameter controllers may include a controller to optimize a harmonic of the leading edge portion 209 of the discrete charge period 201, a controller to optimize the duration of the body portion 203 of the discrete charge period, a controller to optimize the lowest voltage magnitude at the bottom of the fade portion 214 of the discrete charge period, and/or a controller to optimize the rest period of the discrete charge period before a new discrete charge period is generated. For example, the $Z_{R\_BODY}$ and/or $Z_{R\_EDGE}$ determined above may be utilized to determine the harmonic of the leading edge portion 209 of the discrete charge period 201. Other aspects or characteristics of the discrete charge period may also be optimized by one or more controllers. Each discrete charge period parameter controller may receive an aspect of the impedance measurements or estimations, voltage measurements, current measurements, and the like of the charge waveform 201. Further, each controller may adjust weighting applied to the inputs to generate a highest optimization value for the corresponding portion of the discrete charge period 201 or to minimize damage to the battery cell 104, as explained in more detail below. Such optimization may occur separately or concurrently by the discrete charge period parameter controllers. In one implementation, the controllers may execute sequentially based on one or more rules to determine the sequence of the execution. Further, the sequence of controller execution may be adjusted based on one or more event triggers obtained from the measurements of the charge waveform 201.

In operation 310, the circuit controller 110 may control the charge signal shaping circuit 106 to generate a discrete charge period based on the outputs from the discrete charge period parameters controllers. In general, the outputs from the discrete charge period parameter controllers provide an optimized discrete charge period 201 for applying charge to the battery cell while minimizing or reducing the impedance at the battery cell electrodes. The translation of the controller outputs may generate the control signals for the shaping circuit 106 to adjust the shape of the discrete charge period to optimize the charge signal. For example, the discrete charge period parameter controller corresponding to the harmonic of the leading edge 209 of the discrete charge period 201 may output a frequency for the leading edge to optimize or reduce high frequency harmonics from the leading edge. The circuit controller 110 may then generate one or more control signals for the shaping circuit 106 to adjust the harmonic of the leading edge of the discrete charge period to correspond to the output of the controller. Other aspects of the discrete charge period may be similarly controlled based on the output of the discrete charge period parameter controllers, such as the duration of the discrete charge period and the voltage below the transition voltage for the fade portion of the discrete charge period. In this manner, the calculated or estimated impedance of the battery cell 104 may be used to adjust or control the shape of charge waveforms provided to the battery cell.

In some instances, the circuit controller 110 may consider a state of charge or other characteristic in addition to the measured or estimated impedance values to control the charge signal shaping circuit 106 to generate a discrete charge period based on the obtained impedance measurements above. For example, the battery cell 104 may be determined, by the circuit controller 110, to have a state of charge below 10% with a float voltage below a nominal voltage at the start of a charging session. After obtaining the impedance measurements or determinations during a discrete charge period as explained above, the circuit controller 110 may control a discrete charge period generating circuit to adjust the discrete charge period in response to the determined impedances. For example, a subsequent discrete charge period may be controlled to have a similar shape as that illustrated in FIG. 2. More particularly, based on the impedance measurements or estimations discussed above and a determination of a start of charge of the battery cell 104, the sinusoidal leading edge 209 of the subsequent discrete charge period 201 may be controlled to match a frequency that is above a frequency associated with a minimum impedance of the battery cell. The frequency of the leading edge 209 may be selected by the circuit controller 110 such that the impedance at the battery cell 104 during the leading edge 209 is within a particular tolerance of the measured or calculated impedance values, such as within 12% of a measured minimum impedance ($Z_{min}$), a measured real impedance ($Z_r$), a calculated modulus impedance ($Z_{mod}$), or any other impedance-based measurement or calculation.

The circuit controller 110 may then apply a constant voltage, sloped, or shaped for the body portion 203 of the discrete charge period 201. During the body portion, the current may, in some instances, continue to rise as diffusive processes within the battery cell 104 may still be transient. In such instances, the duration of the body 203 may be adjusted by the circuit controller 110 such that the current peaks at the midpoint of the body 203. This may provide for the current to return, at the end of the body 203, to the same or similar value at the beginning of the body 203 portion, due to the onset of mass transport limitations and increasing voltage gradients between components within the cell. At the trailing edge 205 of the discrete charge period 201, the current may lag the voltage signal but may ultimately fall to zero magnitude. In some instances, the period 216 for the current to fall to zero magnitude may be controlled to be within an acceptable period (such as 15% of the leading edge period). In other instances, the current may be uncontrolled when returning to zero amps after the trailing edge 232 of the discrete charge period 201. This may provide for a lower peak voltage and peak current for a given target charge rate of the battery cell 104, which may minimizes polarization, gas evolution, and temperature increase in the battery cell 104. A suitable rest period between discrete charge periods may be based on the duration of the leading edge 209 and body 203 of the charge signal and may be applied to allow the battery cell 104 to dissipate additional heat while maintaining the target charge rate.

At a state of charge from 35% to 65%, the impedance of the battery cell 104 may become increasingly sensitive to peak voltage and peak current of the discrete charge period. In response, the circuit controller 110 may adjust the harmonic of the body portion 203 of the discrete charge period 201 to center around the minimum impedance frequency, while the harmonic associated with the leading edge 202 may be selected to yield a narrower sinusoidal signal (a leading edge 209 with a shorter period). These alterations to the discrete charge period may result in a higher average impedance at the battery cell 104 due to the faster leading edge, such as up to 25% of the minimum impedance. As such, the current may require additional time to approach zero at the trailing edge 205 of the discrete charge period 201. To decrease the time necessary for the current to stabilize to zero amps indicating depolarization of the cell, the voltage dip 214 at the end of the discrete charge period 201 may be decreased to as much as 2.6V instead of returning to the cell's float voltage as above. This voltage dip 214 may be held for a period that allows the current 232 to approach zero within 15% of the leading edge period, and is then gradually raised to the float voltage at a gradient to minimize partial discharge due to current overshoot below zero as well as current oscillation around zero.

Near the maximum allowable average voltage (~80% SOC) of the battery cell 104, the impedance of the battery cell may necessitate less variation between the frequency of the leading edge 209 and the frequency of the body 203 of the discrete charge period 201. In such circumstance, the discrete charge period 201 may be controlled to within a 22% deviation from the minimum impedance. As the anode and cathode of the battery cell 104 are near upper and lower bounds of lithium concentration, respectively, the impedance of the battery cell 104 may provide for a longer rest period between charge periods while becoming less sensitive to peak voltage and current values for a given charge rate. Adjustment to the discrete charge period 201 allows the charge system to maintain efficient charging with lower polarization and without excessive heat, electrochemical side reactions, or capacity loss.

In other instances, a microcontroller or other digital-based measuring system may be utilized to calculate impedance of the battery cell 104 and control the charge waveform 201 in response. In particular, three voltage measurements of a voltage signal, such as voltage signal 202, may be obtained by a microcontroller and three current measurements of a current signal 204 may be obtained. The measurements may be obtained at the same time in the time domain in the time domain and may therefore be used to calculate two impedance values, $Z_1$ and $Z_2$. For example, measurements $V_1$ and $I_1$ may be obtained at the same time within the time domain of the discrete charge period. Additional measurements of the waveforms 202, 204 may also be obtained, as described above. The impedance values $Z_1$ and $Z_2$ may be used in a similar manner as described above to determine one or more features or aspects of a charge signal and may be utilized by the control circuit 110 to control aspects of the circuit 100 to shape the charge signal accordingly to generate the optimized charge signal from the combination of the controlled waveform.

Figure 4A:
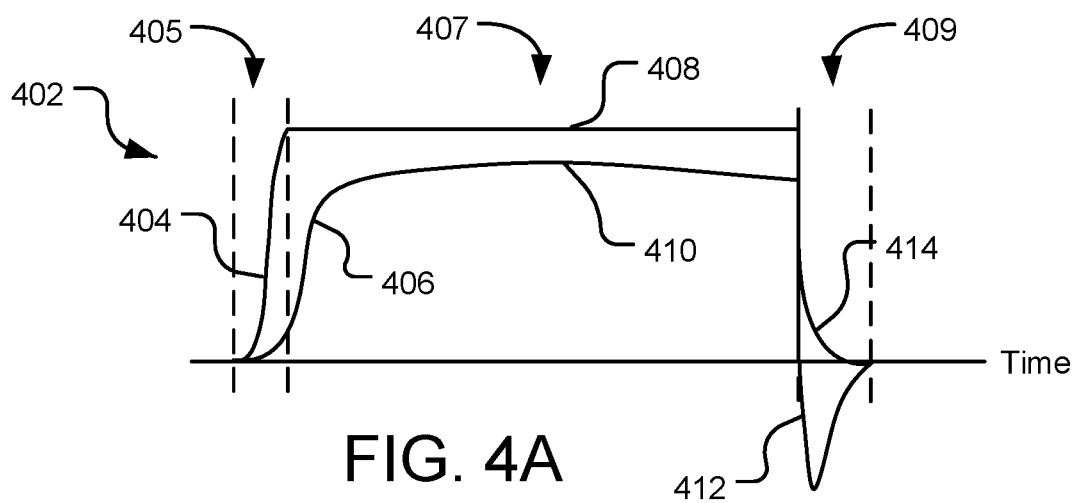
FIG. 4A is a signal diagram of a measured variation in current across a battery cell in response to a first applied voltage discrete charge period in accordance with one embodiment.

In many instances, the current through the battery cell 104 corresponds to the shape and characteristics of the voltage of the discrete charge period (for a voltage-controlled discrete charge period). FIG. 4A is a diagram of a voltage component 404 and a current component 406 of a discrete charge period 402 applied to a battery, with the voltage and current both measured. Similar to FIG. 2, the discrete charge period 402 is generated through control of the voltage 404 of the signal 402 and may include a leading edge section 405, a body section 407, and a trailing section 409. In the example illustrated in FIG. 4A, the voltage component 404 of the leading edge 405 may include a sharp edge reflective of a relatively high frequency harmonic. However, due to the impedance at the battery cell 104 associated with the leading edge harmonic, the current at the battery cell (illustrated at curve 406) may rise slower than the voltage and be delayed relative to the voltage. As the impedance at the battery cell 104 corresponds to a ratio of the voltage 404 and the current 406 components, it can be seen that a relatively high frequency leading edge harmonic of the discrete charge period 402 is associated with some impedance that effects the current component of the signal. Further, as shown in FIG. 4A, the voltage 408 may be controlled, in a body portion 407 of the discrete charge period 402, to be at a constant value. However, the response in the current component 410 of the discrete charge period 402 may continue to rise through a portion of the body section 407 due to the impedance of the battery cell 104, which is illustrated in FIG. 4A by the separation of the voltage signal 408 and the current signal 410 in the body portion. The deviation between the voltage signal 408 and the current signal 410 in FIG. 4A illustrates an approximation of the real component or magnitude of the impedance at the battery cell 104 and the delay in the current signal responding to the leading edge of the applied voltage 408 represents an imaginary component or phase shift of the impedance. Plots of the voltage component 408 and the current component 410 may be scaled and overlaid to generate the signal diagrams of FIGS. 4A-4C. The rate at which the current rises in the body section 407 may relate to the transition of the voltage signal 404 from the leading edge to the body section 407. Further, as mentioned above, the duration of the body portion 407 of additional or future discrete charge periods may be controlled such that the peak of the current 410 in the body section 407 occurs at the midpoint of the body section. Therefore, in some instances, a downward slope of the current component 410 of discrete charge period 402 during the body portion 407 may be monitored and/or measured and a trailing edge portion 409 of the discrete charge period may begin at a point when the current is projected to return to a similar current as at the beginning of the body portion. At the trailing edge of the discrete charge period 402 and as described above, the voltage 412 may be driven below the transition voltage for a period of time to drive the current 414 to zero amps at a faster rate as compared to a discrete charge period without such a shape.

Figure 4B:
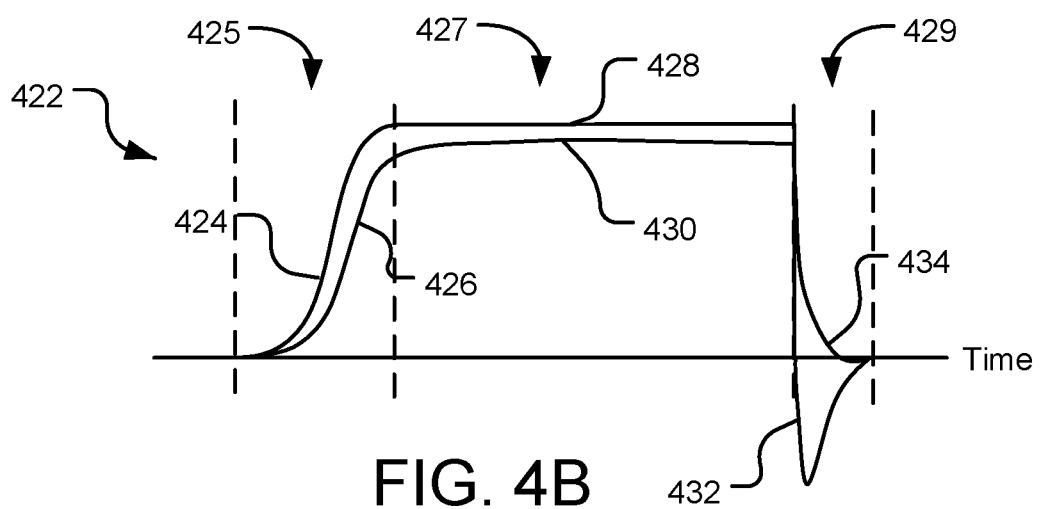
FIG. 4B is a signal diagram of a measured variation in current across a battery cell in response to a second applied voltage discrete charge period in accordance with one embodiment.

In another instance of a discrete charge period 422 illustrated FIG. 4B, the leading edge 425 of the discrete charge period 422 may be defined by a relatively lower frequency harmonic (a less sharp rate relative to the discrete charge period of FIG. 4A)) during the leading edge section 425. The lower frequency harmonic leading voltage edge is associated with a lower impedance that is reflected by the current 426 portion of the discrete charge period 422 more closely following the curve of the voltage-controlled portion 424, both in amplitude and in time. Further, as the transition from the leading portion 425 to the body portion 427 is less severe, again relative to the discrete charge period of FIG. 4A, the apex in the current portion 430 may be similarly less pronounced such that the current amplitude and/or shape more closely mirrors the voltage shape during the body portion. A similar voltage dip 432 in the trailing portion 429 of the discrete charge period 422 as illustrated in the discrete charge period of FIG. 4A may be present in the discrete charge period 422 of FIG. 4B to drive the current 434 to zero amps in preparation for the transmission of another charging waveform.

Figure 4C:
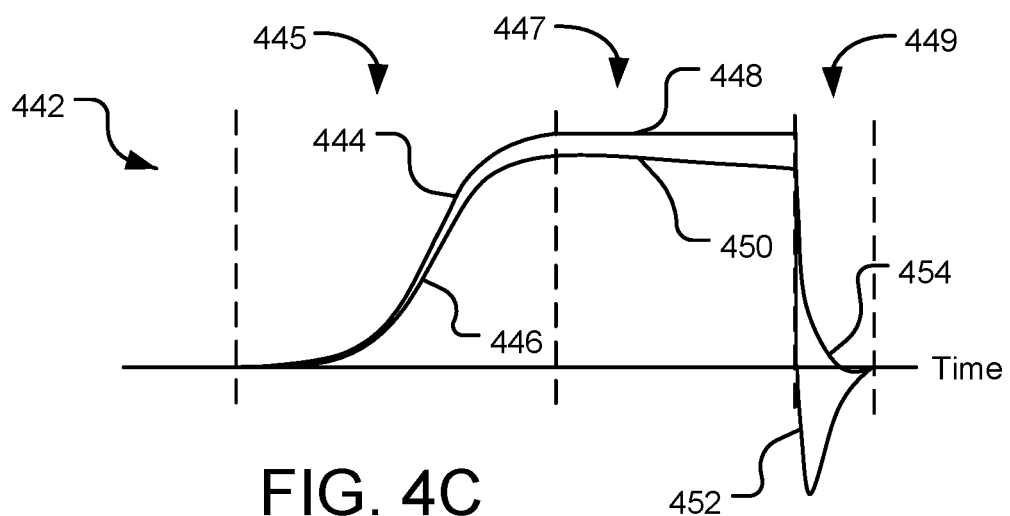
FIG. 4C is a signal diagram of a measured variation in current across a battery cell in response to a third applied voltage discrete charge period in accordance with one embodiment.

In yet another example of a discrete charge period 442 as illustrated in FIG. 4C, the leading edge 445 of the voltage signal 444 may be defined by an even lower frequency harmonic as compared to those of FIGS. 4A and 4B defining an even flatter rise. In this instance, the current 446 portion of the discrete charge period may even more closely mirror the curve of the voltage-controlled portion 444 in comparison to the discrete charge periods of FIGS. 4A and 4B. However, the current 450 during the body portion 447 may have a small to no apex as previously mentioned, but may instead gradually decrease as the voltage 448 is maintained at a constant due to diffusive processes within the battery cell 104. This discrete charge period 442 example may also include a voltage dip 452 in the trailing portion 449 of the discrete charge period 442 to drive the current 454 to zero amps.

Shaping the discrete charge period to charge a battery cell 104 may include a balancing of efficiency and delivery of maximum power per period. For example, the discrete charge period 402 of FIG. 4A may provide a large amount of charge power as the voltage reaches the peak value rapidly such that the discrete charge period approaches a square-wave shape. However, the sharp rise in the leading section 405 of the discrete charge period 402 followed by the sharp transition to the body portion 407 may introduce high harmonics in the signal. As discussed above with relation to FIG. 1C, such high harmonics may cause a large impedance at the battery cell 104, resulting in large inefficiencies in the charging of the battery. Alternatively, although the discrete charge period 442 of FIG. 4C may reduce or minimize the harmonics within the discrete charge period that provide a high impedance at the battery cell 104 due to the slower leading edge 445, the amount of mean power provided to the battery cell 104 (corresponding to the area under the discrete charge period) in this discrete charge period 442 is less than the discrete charge periods of FIGS. 4A and 4B. Thus, the impedance may be reduced in comparison to the other charge signals, but less power is delivered to the battery cell 104 to charge the cell. The discrete charge period 422 of FIG. 4B provides a balance between the contrasting considerations of impedance and power delivery during charging of a battery cell.

Figure 5:
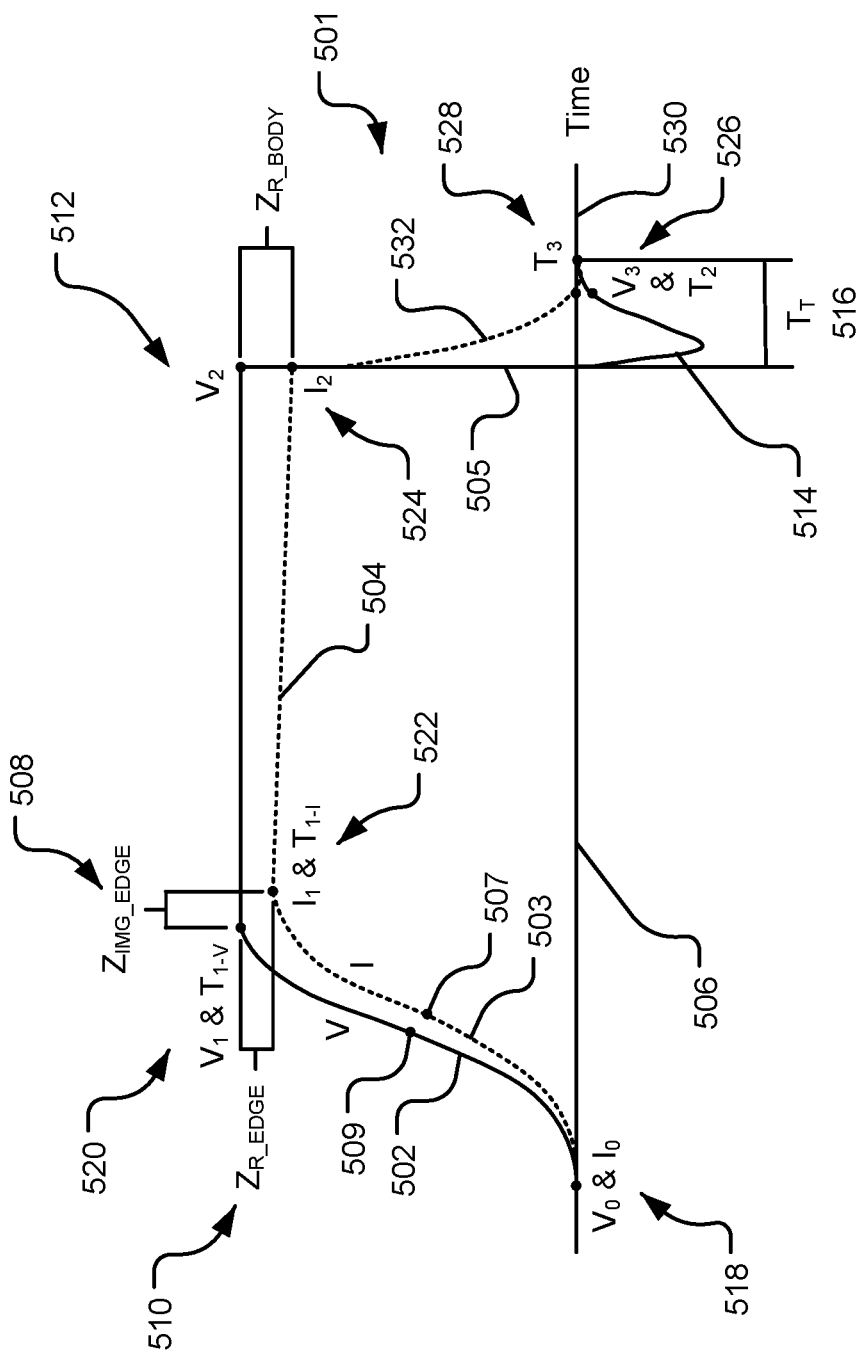
FIG. 5 is a signal diagram of a measured variation in current across a battery cell in response to a voltage-controlled discrete charge period in accordance with one embodiment.

To achieve the balance between the considerations of impedance and power delivery, a circuit controller 210 may monitor or measure the impedance at the battery cell 104 and adjust the shape, including any component thereof, of the discrete charge period in response. In some instances, rather than relying on discrete measurements of voltage and current, which may be used to obtain impedance characteristics or values, the system may estimate one or more of the measurements described above. For example, FIG. 5 illustrates a discrete charge period 501, which may be a part of a charge signal for charging a battery cell 104. The signal diagram 501 is similar to the discrete charge period 201 described above in relation to FIG. 2, including the indication of points along the discrete charge period (both for the voltage component 502 of the discrete charge period 501 and the current component 503 of the discrete charge period). For example, the circuit controller 110 may determine a voltage at point 520, point 512, etc. and a current at point 522, point 524, etc. These measurements may be utilized to determine the impedance of the battery cell 104 at various times along the discrete charge period. However, rather than discrete measurements at one or more of these points, the system may instead estimate one or more of the measurements at the indicated points.

For example, voltage $V_1$ may be measured at the transition point 520 of the voltage component between the leading edge portion of the discrete charge period 501 and the body portion of the discrete charge period. Current $I_1$ may similarly be measured at the transition point 522 for the current component of the discrete charge period. In a voltage-controlled system, the transition point 520 may be determined and the voltage measured accordingly based on the control of the voltage component—e.g., a measurement is made at the time when the voltage transitions from the leading edge to the constant body value. Since the current transition is not aligned with the voltage transition, the system cannot simply measure current at the same time it measures voltage at the transition point. Thus, accurately measuring the current component at the correct time to align with the transition may be difficult, and a measurement either earlier or later than the actual transition may result in some inaccuracies in the estimation of the impedance at the battery cell. Thus, in one possible implementation, the circuit controller 110 may estimate one or more of the voltage, current, or time measurements discussed herein to improve the efficiency or accuracy of the impedance determinations at the battery cell 104.

In one implementation, the circuit controller 110 may obtain the rate of change of the voltage measurements of the voltage component 502 and the rate of change of the current measurements of the current component 503 during the leading edge portion of the charge signal. The rate of change of the components may correlate to the slope of the corresponding charge signal components. Through the monitoring of the rate of change of the components, the point along the leading edge at which the slope or the rate of change is the maximum may be determined. For example, the maximum slope point 509 for the voltage component of the discrete charge period 501 may be obtained by measuring the voltage along the curve 502 to find the transition between an increasing rate of change and a decreasing rate of change. This inflection point 509 may be the maximum slope of the voltage curve 502. In a similar manner, the inflection point 507 for the current component 503 of the discrete charge period 501 may also be determined. With the point 518 at which the waveform is begun and the inflection points 507, 509 of the voltage component 502 and the current component 503 determined, the system may estimate a time at which each respective component transitions from the leading edge portion to the body portion of the discrete charge period. In particular, as the leading edge of the discrete charge period is a sinusoidal shape, the inflection points 507 and 509 may be assumed to occur at the midpoint of the leading edge of the discrete charge period 501. Thus, the circuit controller 110 may then estimate the transition point 522 or 520 from the leading edge to the body portion of the discrete charge period 501 as occurring at a point that is twice the duration from the initial point 518 to the midpoint 507 and 509 for the respective component of the discrete charge period. The circuit controller 110 may obtain a voltage measurement at point 520 and a current measurement at point 522 based on this estimation. The measurements of voltage and current at these estimated (or calculated) times may be used to determine $Z_{R\_EDGE}$ and/or $Z_{IMG\_EDGE}$, or any other impedance measurement discussed herein.

In another example, the circuit controller 110 may accept a certain amount of error in the voltage and/or current measurement in calculating the impedance at the battery cell 104. For example, for a voltage-controlled discrete charge period 504, the circuit controller 110 may determine point 520 as the point at which the controlled voltage signal transitions from the leading edge, sinusoidal signal to the constant voltage of the body portion. However, rather than estimating the corresponding transition point 522 for the current component 503 of the discrete charge period 501, the circuit controller 110 may obtain a current measurement at the time of transition point 520 or at some fixed time delay therefrom. Although some error in the impedance value at the battery cell 104 is present in the comparison of the voltage $V_1$ and a current measurement at the same time or a time thereafter due to the delay in the current component 503 response, such an error may be acceptable by the circuit controller 110 when measuring the impedance at the battery cell 104. A similar approach may be utilized for current-controlled discrete charge periods by obtaining a voltage measurement at the point of transition of the current component from the leading edge portion to the body portion of the charge signal 501.

In still another instance, the voltage component of the discrete charge period 501 may not transition to the constant voltage of the body portion at the peak of the leading edge portion. Rather, as shown in FIG. 6A, the voltage component 602 may be controlled to continue the sinusoidal shape until the current component 603 reaches the apex of the leading edge portion. More particularly, the leading edge portion of the discrete charge period 601 may include a single harmonic, sinusoidal shape, such that the current portion 603 following the voltage portion is a similar sinusoidal shape. Because the discrete charge period 601 is a single harmonic, the time at which the apex of the current portion 603 of the discrete charge period 601 occurs may be accurately determined and the current $I_1$ at point 622 may be measured at the apex of the current portion of the leading edge. Following the determination of the time at which point 622 occurs, the voltage portion 604 may be defined such that it transitions from an initial downward portion of the sinusoidal harmonic to a constant voltage for the body of the discrete charge period 601. Doing so, may cause a very low impedance at this point and may cause the body portion of the signal to be applied at a very low impedance. The low impedance being exemplified by the little or no separation between the voltage and current components of the signals in the body portion of the discrete charge period.

In another instance illustrated in FIG. 6B, the voltage portion 616 may be controlled to take on a Bessel Function shape of diminishing sinusoidal waves for the body portion of the discrete charge period 610. Controlling the voltage component 616 into a Bessel Function shape may reduce high harmonics that may be introduced in the transition from the sinusoidal leading edge to the constant voltage portion at point 620. However, the use of the Bessel Function signal shape may also reduce the power delivered to the battery cell 104. Through the use of the continued sinusoidal leading edge voltage signal 616, an accurate determination of the apex 620 of the current portion 614 of the leading edge may be obtained for a more accurate measurement of $I_1$. Further, the control circuit 110 may control the voltage portion of the discrete charge period 616 as a Bessel Function to occur at less than each of the discrete charge periods to the battery cell 104. For example, a Bessel Function discrete charge period 610 may occur once out of every 100 or 1000 discrete charge periods to obtain an accurate reading of $I_1$ without reducing the power delivered at every discrete charge period.

In yet another instance and returning to FIG. 5, the circuit controller 110 may calculate cumulative impedance for each portion or section of the discrete charge period 501. For example, the circuit controller 110 may obtain a voltage measurement and a current measurement for several points along the leading edge portion of the discrete charge period. Corresponding voltage measurements and current measurements may occur at the same time. Thus, although the current component 503 of the discrete charge period 501 is trailing the voltage component 502, the circuit controller 110 may obtain simultaneous voltage and current measurements to estimate a real impedance value or impedance magnitude value at the several points along the leading edge curve of the discrete charge period 501. The impedance measurements at the various points along the leading edge may be summed to obtain a real impedance for the battery cell 104 during the entirety of the leading edge of the discrete charge period 501. In a similar manner, horizontally corresponding measurements of the two components 502, 503 may be obtained at various points along the leading edge of the discrete charge period 501. For example, the time between the occurrence of a particular voltage measurement and a corresponding current measurement may be obtained and an imaginary impedance value or impedance phase shift value for the battery cell 104 may be approximated from the measured values and time delay. A series of such imaginary impedance measurements may be summed to obtain a cumulative imaginary impedance for the battery cell 104 during the leading edge portion. Similar approaches may be performed for the body portion of the discrete charge period 501. The summations of the impedances of the battery cell 104 for the portions of the discrete charge period 501 may then be utilized to adjust the shape of future waveforms, as explained above.

In another example, the circuit controller 110 may analyze other features of the leading edge of the discrete charge period 501 and adjust future discrete charge periods in response. In particular, the circuit controller 110 may measure various points of the voltage component 502 and/or the current component 503 and compare the measurements to an example sine wave shape corresponding to the selected harmonic of the leading edge. As controlled by the circuit controller 110, the leading edge portion of the discrete charge period 501 may include abnormalities from a true sine wave shape. These abnormalities may be detected by a comparison of the generated discrete charge period 501 to the example sine wave and adjustment to a future discrete charge period may be made by the circuit controller 110 to better approximate the example sine wave signal. Such adjustments may be made to the voltage component 502 and/or the current component 503 of the discrete charge period 501 to better approximate the example sine curve.

As mentioned above, hundreds or thousands of measurements of the voltage and current portion of the charge signal may be obtained and analyzed via a digital processing system to shape the discrete charge period of the battery cell 104. In one particular example, points of the discrete charge period may be analyzed via domain transformation between time and frequency. In this example, the edges and body of the discrete charge period may not be defined as described above based on the measured impedance values. Instead, the discrete charge period may be controlled to take on a more arbitrary shape. Further, the rest period between discrete charge periods may be subject to the same analysis and distinctions between edge, body and rest periods may further erode.

In this example, voltage and current discrete charge periods (for a single period or multiple, averaged periods) may be measured in the time domain. Fast Fourier transform (FFT), or many other types of transformations, may be used to convert the measured time domain data to corresponding data in the frequency domain. In some instances, the selection of the type of transformation used may depend upon the format of the data, the type of noise and signal to noise ratio in the data, or the processor type of the circuit controller 110. One or more of these factors may allow some transforms to process faster or better than FFT. By transforming the discrete charge period data into the frequency domain, the magnitudes of individual harmonics within the discrete charge period may be exposed and manipulated to generate a multi-harmonic discrete charge period. In particular, each harmonic obtained from the transform of the discrete charge period may be independently analyzed, comparing voltage and current, to determine the independent contribution of each to impedance, power, peak voltage and current at the battery cell 104. For example, harmonics with relatively high impedance qualities at the battery cell 104 can be reduced in magnitude and others may be increased to produce a more ideal collection of harmonics of the discrete charge period 201. The modified transforms may then be inversely transformed back into the time domain, yielding a new discrete charge period with a lower overall impedance that may be applied as an improved discrete charge period. Further, in some instances, gating may be performed on the transformed discrete charge period to independently analyze individual sections of the discrete charge period, with each inversely transformed section rejoined to produce an improved form of the complete discrete charge period.

More particularly, the process of gating the transformed discrete charge period may include transforming only a portion of the time domain data to the frequency domain for independent analysis. For example, the discrete charge period may be divided into fifths and each fifth independently evaluated along with or in lieu of whole wave analysis. This is especially useful when sections of the wave are heavily multi-modal in magnitude or harmonic content, such as body vs rest period. The gating process may provide a more accurate estimation of an imaginary and real component of impedance, and may be useful in analyzing/reducing oscillations that can occur in the discrete charge period due to the impedance of the battery cell 104. Gating may also provide a foundation for a mechanism of adjusting the total period of the discrete charge period. For example, a single gated section of the discrete charge period may include a portion of the rest period and adjustments to the harmonics of the section may reduce or extend the effective period.

In addition to the calculations discussed above, other calculations may also be determined based on measurements obtained from the charge waveform. For example, multiple measurements of both the voltage waveform 202 and/or the current waveform 207 for multiple discrete charge periods of the waveform may be obtained and summed to generate an average impedance value for the multiple discrete charge periods. In one example, a total impedance of the leading edge portion of the multiple discrete charge periods with elapsed time $\Delta t$ may be determined by:

$$\sum \frac{V_1}{I_0} * \Delta t$$

Similarly, a total impedance of the body portion of the multiple discrete charge periods with elapsed time $\Delta t$ may be determined by:

$$\sum \frac{V_2}{I_1} * \Delta t$$

Other impedance calculations may also be determined from measurements obtained from multiple discrete charge periods or other portions of the charge waveform. For example, a maximum impedance for the body portion 203 of one or more discrete charge periods may be determined by:

$$\text{Maximum}\left(\frac{V_i}{I_i * \Delta t}\right)$$

for measured values (i) between the start of the body portion to the end of the body portion. A delta mean of the impedance for the body portion 203 of one or more discrete charge periods may be determined by:

$$\sum_{\text{Bodystart}}^{\text{Bodyend}} \frac{V_N}{I_N * \Delta t} \Big/ (\text{Bodyend} - \text{Bodystart})$$

Further, a delta minimum of the impedance for the body portion 203 of one or more discrete charge periods may be determined by:

$$\text{Minimum}\left(\frac{V_i}{I_i * \Delta t}\right)$$

for measured values (i) between the start of the body portion to the end of the body portion.

In some instances and in response to noise that may be present in the discrete charge period, impedance measurements may be approximated from one or more centroid calculations. More particularly, the different portions of the discrete charge period, such as discrete charge period 201 of FIG. 2, may include a centroid or arithmetic mean position of all of the points in the corresponding portion. This may aid in reducing noise in the impedance calculations discussed above. In one example, a centroid for the leading edge portion of the discrete charge period 201 and a centroid for the body portion of the discrete charge period may be calculated. These centroid points may be utilized by the circuit controller 110 as the impedance measurements for those portions of the discrete charge period and may be minimized to improve the efficiency of the applied discrete charge period to the battery cell 104. For example, the centroid of the voltage component 202 of the leading edge portion of the discrete charge period 201 may be calculated from:

$$\overline{V}_{EDGE} = \frac{\int_{V\_min}^{V\_max} V*(t_1 - t_0)dV}{\text{Total Edge Area}} ; \overline{t}_{V\_EDGE} = \frac{\int_{t0}^{t1} t*(V_{MAX} - V_{MIN})dt}{\text{Total Edge Area}}$$

with $t_1$ corresponding to point 222 and to corresponding to point 218 and the maximum and minimum values corresponding to the maximum and minimum measured values within the leading edge portion. The centroid of the current component 207 of the leading edge may be calculated from:

$$\overline{A}_{EDGE} = \frac{\int_{A\_min}^{A\_max} A*(t_1 - t_0)dA}{\text{Total Edge Area}} ; \overline{t}_{A\_EDGE} = \frac{\int_{t0}^{t1} t*(A_{MAX} - A_{MIN})dt}{\text{Total Edge Area}}$$

In a similar manner, centroid of the voltage component of the body portion 203 of the discrete charge period 201 may be calculated from:

$$\overline{V}_{BODY} = \frac{\int_{V\_min}^{V\_max} V*(t_2 - t_1)dV}{\text{Total Body Area}} ; \overline{t}_{V\_BODY} = \frac{\int_{t1}^{t2} t*(V_{MAX} - V_{MIN})dt}{\text{Total Body Area}}$$

with $t_0$ corresponding to point 222 and $t_1$ corresponding to point 212 and the maximum and minimum values corresponding to the maximum and minimum measured values within the leading edge portion. The centroid of the current component 204 of the body portion may be calculated from:

$$\overline{A}_{BODY} = \frac{\int_{A\_min}^{A\_max} A*(L_2 - L_1)dA}{\text{Total Body Area}} ; \overline{t}_{A\_BODY} = \frac{\int_{t1}^{t2} t*(A_{MAX} - A_{MIN})dt}{\text{Total Body Area}}$$

From the centroid points calculated, real and imaginary impedance values for the leading edge portion may be calculated from:

$$Z_{R\_EDGE}^c = \frac{\overline{V}_{EDGE}}{\overline{A}_{EDGE}} ; Z_{I\_EDGE}^c = \frac{\overline{t}_{V\_EDGE}}{\overline{t}_{A\_EDGE}}$$

and centroid impedance modulus for the leading edge may be calculated from:

$$Z_{M\_EDGE}^c = \sqrt{Z_{R\_EDGE}^{c^2} + Z_{I\_EDGE}^{c^2}}$$

Real and imaginary impedance values for the body portion may be calculated from:

$$Z_{R\_BODY}^c = \frac{\overline{V}_{BODY}}{\overline{A}_{BODY}} ; Z_{I\_BODY}^c = \frac{\overline{t}_{V\_BODY}}{\overline{t}_{A\_BODY}}$$

and centroid impedance modulus for the body portion may be calculated from:

$$Z_{M\_BODY}^c = \sqrt{Z_{R\_BODY}^{c^2} + Z_{I\_BODY}^{c^2}}$$

Although discussed above as calculating real and imaginary impedance values for the leading edge portion of the discrete charge period, it should be appreciated that the centroid calculations for the leading edge may not generally be utilized by the circuit controller 110 to determine the harmonic of the leading edge as such centroid calculations are arithmetic mean positions of all of the points in the corresponding portion. Rather, in some implementations, the centroid equations discussed above for the leading edge may be utilized by the circuit controller 110 to verify an estimate of the impedance at the leading edge, particularly for discrete charge periods that may include noise within the signal. Utilizing the centroid calculations to verify other estimations of the leading edge portion of the discrete charge period may improve the accuracy of such estimations used to shape additional discrete charge periods. In still other instances, the estimated impedances obtained via one or more of the methods described herein and the estimated impedances based on the centroid calculations may be provided with a particular weighted value. The weighted values assigned to the various methods for obtaining the impedance estimates may be based, in some instances, on an amount of noise in the discrete charge period.

The above centroid equations utilize a continuous integral function to determine the centroid of the waveform portions. In another example, a centroid of a polygon approximating the shape of the portions of the charge waveform 201 may be calculated. It is noted that other methods for calculating a centroid depending upon an orientation of the polygon or 'shape' relative to a preferred axis may also be utilized. Rather, the equations provided below are simply an example of one collection of centroid calculations that may be performed. For example, the equation above to determine the centroid of the voltage component 202 of the leading edge portion of the discrete charge period 201 may be calculated as follows:

$$\overline{V}_{EDGE} = \frac{\int_{V\_min}^{V\_max} V*(t_1 - t_0)dV}{\text{Total Edge Area}} \sim$$

$$\frac{1}{6*\text{Area}_{Vedge}} * \sum_{PolygonStart}^{PolygonEnd} (V_N + V_{N+1})*(t_N V_{N+1} - t_{N+1} V_N)$$

where $$\text{Area}_{Vedge} = \frac{1}{2} * \sum_{PolygonStart}^{PolygonEnd} (t_N V_{N+1} - t_{N+1} V_N)$$

Similarly, the equation to determine the centroid of the time of the voltage component 202 of the leading edge portion of the discrete charge period may be calculated as follows:

$$\bar{t}_{V_{EDGE}} = \frac{\int_{t0}^{t1} t*(V_{MAX}-V_{MIN})dt}{\text{Total Edge Area}} \sim \frac{1}{6*\text{Area}_{Vedge}} *$$
$$\sum_{PolygonStart}^{PolygonEnd}(t_N+t_{N+1})*(t_N V_{N+1}-t_{N+1}V_N).$$

The centroid of the current component 207 of the leading edge may be calculated from:

$$\bar{A}_{EDGE} = \frac{\int_{A\_min}^{A\_max} A*(t_1-t_0)dA}{\text{Total Edge Area}} \sim$$
$$\frac{1}{6*\text{Area}_{Iedge}} * \sum_{PolygonStart}^{PolygonEnd}(I_N+I_{N+1})*(t_N I_{N+1}-t_{N+1}I_N)$$

where $$\text{Area}_{Iedge} = \frac{1}{2} * \sum_{PolygonStart}^{PolygonEnd}(t_N I_{N+1}-t_{N+1}I_N)$$

Similarly, the equation to determine the centroid of the time of the current component of the leading edge portion 211 of the discrete charge period 202 may be calculated as follows:

$$\bar{t}_{A\_EDGE} = \frac{\int_{t0}^{t1} t*(A_{MAX}-A_{MIN})dt}{\text{Total Edge Area}} \sim \frac{1}{6*\text{Area}_{Iedge}} *$$
$$\sum_{PolygonStart}^{PolygonEnd}(t_N+t_{N+1})*(t_N I_{N+1}-t_{N+1}I_N).$$

In a similar manner, centroid of the voltage component of the body portion 203 of the discrete charge period 201 may be calculated from:

$$\bar{V}_{BODY} = \frac{\int_{V\_min}^{V\_max} V*(t_2-t_1)dV}{\text{Total Body Area}} \sim$$
$$\frac{1}{6*\text{Area}_{Vbody}} * \sum_{PolygonStart}^{PolygonEnd}(V_N+V_{N+1})*(t_N V_{N+1}-t_{N+1}V_N)$$

where $$\text{Area}_{Vbody} = \frac{1}{2} * \sum_{PolygonStart}^{PolygonEnd}(t_N V_{N+1}-t_{N+1}V_N)$$

The equation to determine the centroid of the time of the voltage component 202 of the body portion of the discrete charge period may be calculated as follows:

$$\bar{t}_{A\_BODY} = \frac{\int_{t1}^{t2} t*(V_{MAX}-V_{MIN})dt}{\text{Total Body Area}} \sim \frac{1}{6*\text{Area}_{Vbody}} *$$
$$\sum_{PolygonStart}^{PolygonEnd}(t_N+t_{N+1})*(t_N V_{N+1}-t_{N+1}V_N).$$

The centroid of the current component 207 of the body portion 203 of the discrete charge period 201 may be calculated from:

$$\bar{A}_{BODY} = \frac{\int_{A\_min}^{A\_max} A*(t_2-t_1)dA}{\text{Total Body Area}} \sim$$
$$\frac{1}{6*\text{Area}_{Ibody}} * \sum_{PolygonStart}^{PolygonEnd}(I_N+I_{N+1})*(t_N I_{N+1}-t_{N+1}I_N)$$

where $$\text{Area}_{Ibody} = \frac{1}{2} * \sum_{PolygonStart}^{PolygonEnd}(t_N I_{N+1}-t_{N+1}I_N)$$

Similarly, the equation to determine the centroid of the time of the current component of the leading edge portion 211 of the discrete charge period 202 may be calculated as follows:

$$\bar{t}_{A\_BODY} = \frac{\int_{t1}^{t2} t*(A_{MAX}-A_{MIN})dt}{\text{Total Body Area}} \sim \frac{1}{6*\text{Area}_{Ibody}} *$$
$$\sum_{PolygonStart}^{PolygonEnd}(t_N+t_{N+1})*(t_N I_{N+1}-t_{N+1}I_N).$$

As above, real and/or imaginary impedance values for the leading edge portion may be calculated from the centroid points calculated, such as:

$$R_{EDGE} = \frac{\bar{V}_{EDGE}}{\bar{A}_{EDGE}}$$

for a resistance calculation of the leading edge portion and:

$$TR_{EDGE} = \frac{\bar{t}_{V\_EDGE}}{\bar{t}_{A\_EDGE}}$$

for a time ratio edge centroid of the leading edge.

Similarly, real and/or imaginary impedance values for the body portion may be calculated from the centroid points calculated, such as:

$$R_{BODY} = \frac{\bar{V}_{BODY}}{\bar{A}_{BODY}}$$

for a resistance calculation of the body portion and:

$$TR_{BODY} = \frac{\bar{t}_{V\_BODY}}{\bar{t}_{A\_BODY}}$$

for a time ratio edge centroid of the leading edge.

Figure 7:
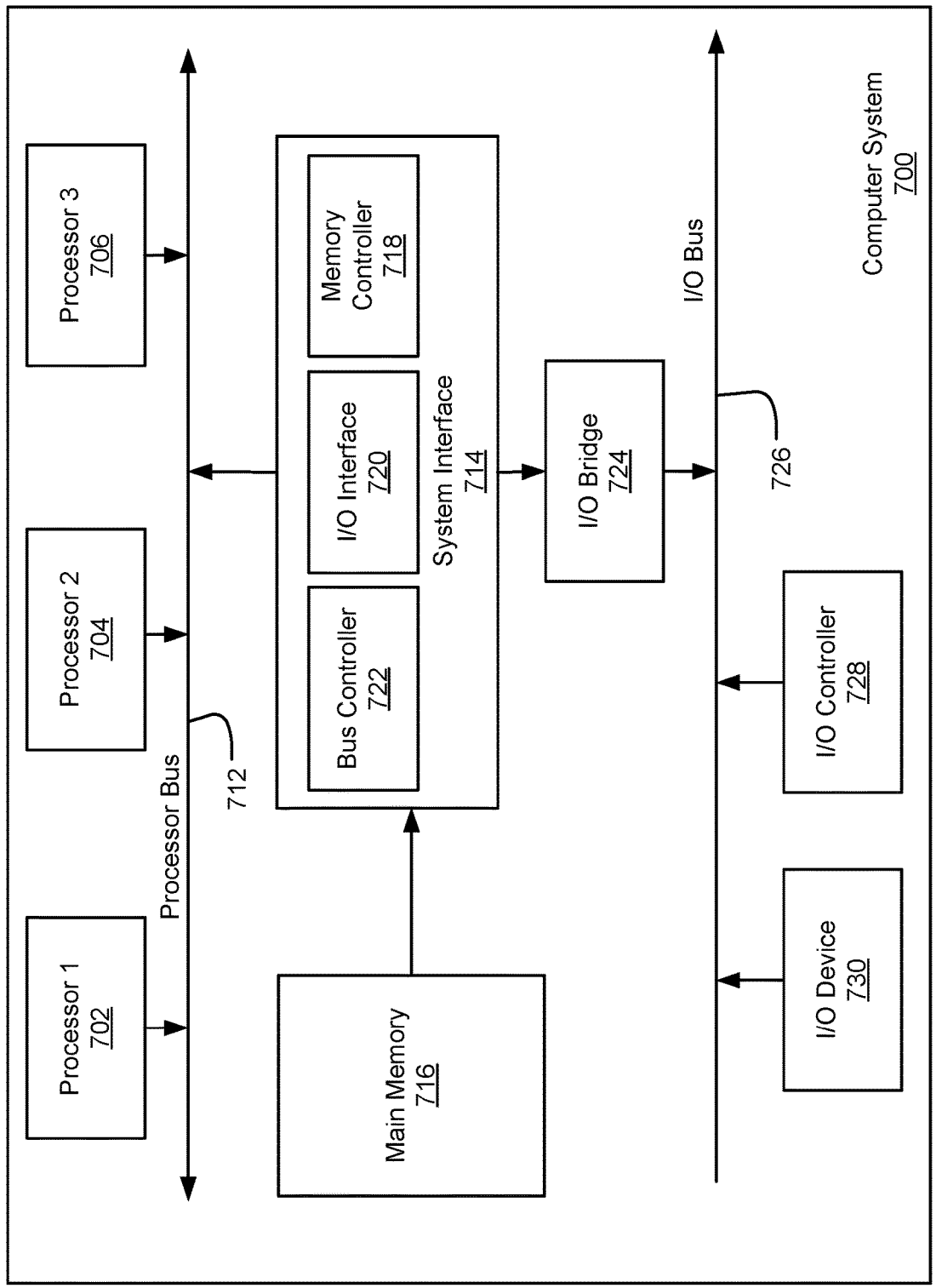
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the network disclosed above. In particular, the computing device of FIG. 7 is one embodiment of a controller that performs one or more of the operations described above. The computer system (system) includes one or more processors 702-706.

Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

We claim:

1. A method for monitoring an electrochemical device comprising:
   obtaining, via a processing device, a plurality of measurements comprising a plurality of voltage amplitudes and a plurality of current amplitudes of a charge waveform applied to an electrochemical device, the charge waveform comprising a plurality of pulses each comprising a plurality of distinct portions of differing shapes;
   calculating a plurality of impedance ratios, wherein each of the plurality of impedance ratios comprise a one of the plurality of voltage amplitude measurements and a one of the plurality of current amplitude measurements, wherein the one of the plurality of voltage amplitude measurements and the one of the plurality of current amplitude measurements are measured during the same distinct portion of the same pulse of the charge waveform;
   obtaining complex impedance characteristics of the electrochemical device by summing at least a first impedance ratio and a second impedance ratio of the subset of the plurality of impedance ratios, wherein:
      the first impedance ratio of the subset of the plurality of impedance ratios comprises a first voltage amplitude measurement and a first current amplitude measurement obtained during a first distinct portion of a first pulse of the charge waveform; and
      the second impedance ratio of the subset of the plurality of impedance ratios comprises a second voltage amplitude measurement and a second current amplitude measurement obtained during a second distinct portion of the a second pulse of the charge waveform, wherein the first distinct portion of the first pulse is the same portion of the plurality of distinct portions as the second distinct portion of the second pulse; and
   altering an attribute of the charge waveform based on the obtained complex impedance characteristics of the electrochemical device.

2. The method of claim 1, wherein the complex impedance characteristics comprise at least one of a real impedance value, an imaginary impedance value, a magnitude impedance value, or a phase shift impedance value.

3. The method of claim 1, wherein the distinct portions of the charge waveform comprises a sinusoidal leading edge portion and a body portion, different than the leading edge portion, following the leading edge portion.

4. The method of claim 3 further comprising:
   estimating a real impedance value of the leading edge portion of the charge waveform by summing the subset of the plurality of impedance ratios corresponding to the leading edge portion.

5. The method of claim 4, wherein the real impedance value corresponds to a voltage amplitude measurement at the electrochemical device obtained at a first time and a current amplitude measurement through the electrochemical device obtained at a second time later than the first time.

6. The method of claim 5 further comprising:
   estimating the second time based on a determined inflection point of a current component of the leading edge portion of the charge waveform.

7. The method of claim 3 further comprising:
   estimating an imaginary impedance value corresponding to the leading edge portion of the charge waveform, the imaginary impedance determined from a difference of the first time and the second time.

8. The method of claim 3 further comprising:
   estimating a real impedance value corresponding to the body portion of the charge waveform by summing the subset of the plurality of impedance ratios corresponding to the body portion.

9. The method of claim 3 further comprising
   determining, based on the plurality of measurements of the voltage amplitude, a first transition a voltage component within the charge waveform from the leading edge portion to the body portion.

10. The method of claim 9 further comprising:
    determining, based on the plurality of measurements of the current amplitude, a second transition a current component within the charge waveform from the leading edge portion to the body portion, the second transition occurring after the first transition.

11. The method of claim 3 further comprising:
    calculating a centroid of the leading edge portion of the charge waveform, the complex impedance characteristics of the electrochemical device further based on the calculated centroid of the leading edge portion.

12. The method of claim 3 further comprising:
    calculating a centroid of the body portion of the charge waveform, the complex impedance characteristics of the electrochemical device further based on the calculated centroid of the body portion.

13. The method of claim 1, wherein the charge waveform comprises one or more discrete charge periods, the measurements of the charge waveform obtained from a first discrete charge period and a second discrete charge period different than the first discrete charge period.

14. A method of charging an electrochemical device comprising:
   for a charge waveform for charging an electrochemical device, the charge waveform comprising a plurality of pulses each comprising a plurality of distinct portions of differing shapes:
      obtaining a representative value indicative of a flow of current to the electrochemical device responsive to the charge waveform, the obtained representative value based on a sum of at least a first impedance ratio and a second impedance ratio of a subset of a plurality of impedance ratios determined from of a subset of the plurality of pulses of the charge waveform, wherein:
      the first impedance ratio of the subset of the plurality of impedance ratios comprises a first voltage amplitude measurement and a first current amplitude measurement obtained during a first distinct portion of a first pulse of the plurality of pulses of the charge waveform; and
      the second impedance ratio of the subset of the plurality of impedance ratios comprises a second voltage amplitude measurement and a second current amplitude measurement obtained during a second distinct portion of a second pulse of the plurality of pulses of the charge waveform, wherein the first distinct portion of the first pulse is the same portion of the plurality of distinct portions as the second distinct portion of the second pulse; and altering an attribute of the charge waveform based on the representative value.

15. The method of claim 14 wherein the representative value is at least one of impedance, admittance, and power.

16. The method of claim 14 wherein the charge waveform includes a shaped leading edge.

17. The method of claim 16 wherein the representative value is impedance, the shaped leading edge is associated with a frequency defined based on a relationship between the frequency and the impedance of the electrochemical device to the frequency of the shaped leading edge of the charge waveform.

18. The method of claim 17 wherein the representative value is based on the impedance of the frequency, and wherein altering the attribute comprises altering a frequency attribute of a shaped leading edge to reduce the impedance of the electrochemical device to the charge waveform.

19. The method of claim 14 wherein the representative value is impedance, the charge waveform defines a body portion, the impedance associated with the body portion, and altering an attribute of the charge waveform comprises altering a period of the body portion based on the impedance.

20. The method of claim 19 wherein the altered period of the body portion is based on maintaining the impedance of the body portion within a threshold.

21. The method of claim 14 wherein the representative value is impedance, the charge waveform defines a body portion, the impedance associated with the body portion, and altering an attribute of the charge waveform comprises altering a frequency of a leading edge harmonic to reduce the impedance associated with the body portion.

22. The method of claim 14 wherein the charge waveform defines a trailing edge with a voltage component and a current component, a following charge waveform applied after the current component of the charge waveform reaches zero.

23. The method of claim 14 wherein obtaining a representative value indicative of the flow of current to the electrochemical device responsive to the charge waveform comprises obtaining a ratio between a voltage component and a current component of the charge waveform to determine a real component of an impedance.

24. The method of claim 23 wherein the ratio is associated with a peak value of a leading edge harmonic of the voltage component of the charge waveform.

25. The method of claim 23 wherein the ratio is associated with a value of a body portion of the charge waveform.

26. The method of claim 23 further comprising:

obtaining the ratio at a point of the harmonic of the voltage component of the charge waveform; and determining an imaginary component of the impedance based on a time difference between the point of the harmonic of the voltage component and a related point of the current component.

* * * * *